United States Patent
Tomkins et al.

(10) Patent No.: US 8,984,098 B1
(45) Date of Patent: Mar. 17, 2015

(54) ORGANIZING A STREAM OF CONTENT

(75) Inventors: Andrew Tomkins, San Jose, CA (US);
Todd Jackson, San Francisco, CA (US);
Shaun Modi, San Francisco, CA (US);
Ray Su, Sunnyvale, CA (US); Justin Lewis Kosslyn, San Francisco, CA (US);
Robert Spiro, San Francisco, CA (US);
Jessica Ko, Mountain View, CA (US);
Cameron Adams, Rozelle (AU)

(73) Assignee: Google Inc., Mountain View, CA (US)

( * ) Notice: Subject to any disclaimer, the term of this patent is extended or adjusted under 35 U.S.C. 154(b) by 171 days.

(21) Appl. No.: 13/329,276

(22) Filed: Dec. 17, 2011

Related U.S. Application Data

(60) Provisional application No. 61/424,636, filed on Dec. 18, 2010.

(51) Int. Cl.
*G06F 17/30* (2006.01)

(52) U.S. Cl.
USPC ........................................................ 709/219

(58) Field of Classification Search
None
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,003,515 B1 | 2/2006 | Glaser et al. |
| 7,106,848 B1 | 9/2006 | Barlow et al. |
| 7,366,990 B2 | 4/2008 | Pitroda |
| 7,401,025 B1 | 7/2008 | Lokitz |
| 7,555,110 B2 | 6/2009 | Dolan et al. |
| 7,610,287 B1 | 10/2009 | Dean et al. |
| 7,742,468 B2 | 6/2010 | Vagelos |
| 7,761,454 B2 | 7/2010 | Smyth et al. |
| 7,827,110 B1 | 11/2010 | Wieder |
| 7,962,482 B2 | 6/2011 | Handman et al. |
| 8,055,655 B1 * | 11/2011 | He et al. ........................ 707/727 |
| 8,091,032 B2 | 1/2012 | Fischer |
| 2001/0042060 A1 | 11/2001 | Rouse et al. |
| 2002/0137490 A1 | 9/2002 | Gallant |
| 2002/0143874 A1 | 10/2002 | Marquette et al. |
| 2002/0194076 A1 | 12/2002 | Williams et al. |

(Continued)

FOREIGN PATENT DOCUMENTS

WO  WO02079984  10/2002

OTHER PUBLICATIONS

Adamic et al., "A Social Network Caught in the Web," Internet Journal, First Monday, Jun. 2, 2003, pp. 1-22, vol. 8, No. 6.

(Continued)

*Primary Examiner* — Hassan Phillips
*Assistant Examiner* — Omeed D Rahgozar
(74) *Attorney, Agent, or Firm* — Patent Law Works LLP

(57) ABSTRACT

A system and method for generating a stream of content with candidate content items associated with a likelihood of being interesting to a user. A model generation engine generates a model for a user. A scoring engine obtains candidate content items and compares candidate content items to a model to determine the most interesting content items. A user interface engine organizing first and second content items in a first direction and a third content item in a second direction. The user interface engine receives feedback that includes a request for additional content items or a request to remove an interest associated with a selected content item from the model. The model generation engine updates the model in response to feedback.

21 Claims, 20 Drawing Sheets

(56) References Cited

U.S. PATENT DOCUMENTS

| | | |
|---|---|---|
| 2003/0061211 A1 | 3/2003 | Shultz et al. |
| 2004/0258220 A1 | 12/2004 | Levine et al. |
| 2004/0267740 A1 | 12/2004 | Liu et al. |
| 2005/0152521 A1 | 7/2005 | Liljestrand |
| 2006/0020616 A1 | 1/2006 | Hardy et al. |
| 2006/0026288 A1 | 2/2006 | Acharya et al. |
| 2006/0041530 A1 | 2/2006 | Milic-Frayling et al. |
| 2006/0074883 A1 | 4/2006 | Teevan et al. |
| 2006/0077957 A1 | 4/2006 | Reddy et al. |
| 2006/0136589 A1 | 6/2006 | Konig et al. |
| 2006/0167857 A1 | 7/2006 | Kraft et al. |
| 2006/0206604 A1 | 9/2006 | O'Neil et al. |
| 2006/0212444 A1 | 9/2006 | Handman et al. |
| 2006/0242139 A1* | 10/2006 | Butterfield et al. ............... 707/5 |
| 2006/0282336 A1 | 12/2006 | Huang |
| 2007/0016553 A1 | 1/2007 | Dumais et al. |
| 2007/0043742 A1 | 2/2007 | Arguello et al. |
| 2007/0060099 A1 | 3/2007 | Ramer et al. |
| 2007/0109616 A1 | 5/2007 | Thompson |
| 2007/0127631 A1 | 6/2007 | Difiglia |
| 2007/0143260 A1 | 6/2007 | Markov et al. |
| 2007/0171898 A1 | 7/2007 | Salva |
| 2007/0173236 A1 | 7/2007 | Vishwanathan et al. |
| 2007/0219754 A1 | 9/2007 | D'Ambrosio |
| 2007/0244884 A1 | 10/2007 | Yang |
| 2007/0248077 A1 | 10/2007 | Mahle, Jr. et al. |
| 2007/0265905 A1 | 11/2007 | Lazier |
| 2008/0004989 A1 | 1/2008 | Yi |
| 2008/0040474 A1* | 2/2008 | Zuckerberg et al. .......... 709/224 |
| 2008/0056475 A1 | 3/2008 | Brannick et al. |
| 2008/0059308 A1 | 3/2008 | Gerken |
| 2008/0059460 A1 | 3/2008 | Lunenfeld |
| 2008/0077462 A1 | 3/2008 | Patel et al. |
| 2008/0147450 A1 | 6/2008 | Mortimore |
| 2008/0192656 A1 | 8/2008 | Vagelos |
| 2008/0208841 A1 | 8/2008 | Zeng et al. |
| 2008/0209320 A1 | 8/2008 | Mawhinney et al. |
| 2008/0255977 A1 | 10/2008 | Altberg et al. |
| 2009/0113288 A1 | 4/2009 | Thampy et al. |
| 2009/0164408 A1 | 6/2009 | Grigorik et al. |
| 2009/0210321 A1 | 8/2009 | Rapp |
| 2009/0222481 A1 | 9/2009 | Fisher et al. |
| 2010/0030717 A1 | 2/2010 | Agarwal et al. |
| 2010/0042928 A1 | 2/2010 | Rinearson |
| 2010/0131527 A1 | 5/2010 | Wohlert |
| 2010/0138423 A1 | 6/2010 | Moore et al. |
| 2010/0191799 A1 | 7/2010 | Fiedorowicz et al. |
| 2010/0287368 A1 | 11/2010 | Shuster et al. |
| 2010/0299360 A1 | 11/2010 | Yi |
| 2011/0041076 A1 | 2/2011 | Sinn et al. |
| 2011/0098156 A1 | 4/2011 | Ng et al. |
| 2011/0154183 A1 | 6/2011 | Burns et al. |
| 2011/0161323 A1 | 6/2011 | Hagiwara |
| 2011/0161336 A1 | 6/2011 | Shiga et al. |
| 2011/0167054 A1 | 7/2011 | Bailey et al. |
| 2011/0178995 A1 | 7/2011 | Suchter et al. |
| 2011/0196933 A1 | 8/2011 | Jackson et al. |
| 2011/0225170 A1 | 9/2011 | Obasanjo et al. |
| 2011/0246907 A1 | 10/2011 | Wang et al. |
| 2012/0054190 A1 | 3/2012 | Peters |
| 2012/0084291 A1 | 4/2012 | Chung et al. |
| 2012/0102410 A1 | 4/2012 | Gewecke et al. |
| 2012/0113121 A1 | 5/2012 | Luo et al. |
| 2012/0144328 A1 | 6/2012 | O'Byrne |
| 2012/0158753 A1* | 6/2012 | He et al. ........................ 707/752 |
| 2013/0204873 A1* | 8/2013 | Vandermolen et al. ....... 707/736 |
| 2013/0247212 A1* | 9/2013 | Muriello et al. ................ 726/26 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support"Always on" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, pp. 252-255, London, United Kingdom.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, 8 pgs, Apr. 24, 2012.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, May 13, 2011, 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Murchu et al., "Online Social and Business Networking Communities," Digital Enterprise Research Institute DERI Technical Report, National University of Ireland, Aug. 8, 2004, 22 pgs.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

Ring Central, Inc., Internet, retrieved at http://www.ringcentral.com, Apr. 19, 2007, 1 pg.

Singh et al., "CINEMA: Columbia InterNet Extensible Multimedia Architecture," Department of Computer Science, Columbia University, pp. 1-83, Apr. 24, 2012.

Steen et al., "Development of we-centric, context-aware, adaptive mobile services requires empathy and dialogue," Freeband FRUX, Oct. 17, 2005, Internet Journal, Netherlands, pp. 1-4.

(56) References Cited

OTHER PUBLICATIONS

Superfeedr Track, Internet, retrieved at http://blog.superfeedr.com/track/filter/xmpp/pubsubhubbub/track, May 13, 2011, 8 pgs.
Twitter Blog: Tracking Twigger, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

US 8,984,098 B1

ORGANIZING A STREAM OF CONTENT

CROSS REFERENCE TO RELATED APPLICATIONS

This application claims priority under 35 USC §119(e) to U.S. Patent Application No. 61/424,636, entitled "Scoring Stream Items with Models Based on User Interests" filed Dec. 18, 2010, the entirety of which is herein incorporated by reference.

BACKGROUND

The specification relates to displaying a stream of content for a user. In particular, the specification relates to generating a stream of content by comparing candidate content items to a model and displaying selected content items that are in the stream of content.

Consumers of digital media may have goals of keeping apprised of information in areas they already find interesting and discovering new content that is also enjoyable. Keeping apprised of information can become burdensome in the digital age because of the amount of available information. Furthermore, consumers may have varied interests depending on other factors, including the time, e.g. time of a year or a day.

SUMMARY

According to one innovative aspect of the subject matter described in this disclosure, a processor, a scoring engine stored on a memory and executed by the processor obtains a group of candidate content items to a model to determine that a first content item associated with a first type of interest and a second content item associated with a second type of interest are associated with the respective likelihoods of being interesting to a user that exceed a threshold and a user interface engine organizes the first and second content items in the stream of content based on the comparing and provides the stream of content to the user that submitted the request. Other aspects can be embodied in corresponding methods and apparatus, including computer program products.

These and other aspects can include one or more of the following features. In some examples, the first type of interest is a type of interest within the second type of interest. In some examples, the scoring engine identifies a third content item associated with a third type of interest, wherein the third type of interest is outside the second type of interest. In some examples, the second content item is organized in a first direction and the third content item is organized in a different direction. The first direction can be horizontal and the different direction can be vertical. In some examples, the first content item is displayed with a button for requesting additional content items for the first interest. In some examples, a model generation engine receives a selection of the button for removing the interest associated with the selected content item from the model and removes the interest from the model. The scoring engine can generate an updated stream of content based at least in part on an updated model.

In general, another innovative aspect of the subject matter described in this disclosure may be embodied in methods that include obtaining a group of candidate content items for a stream of content, comparing the candidate content items to a model to determine that a first content item associated with a first type of interest and a second content item associated with a second type of interest are associated with respective likelihoods of being interesting to a user that exceed a threshold, organizing the first and second content items in the stream of content based on the comparing and providing the stream of content to the user that submitted the request. Other aspects can be embodied in corresponding systems and apparatus, including computer program products.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1A:
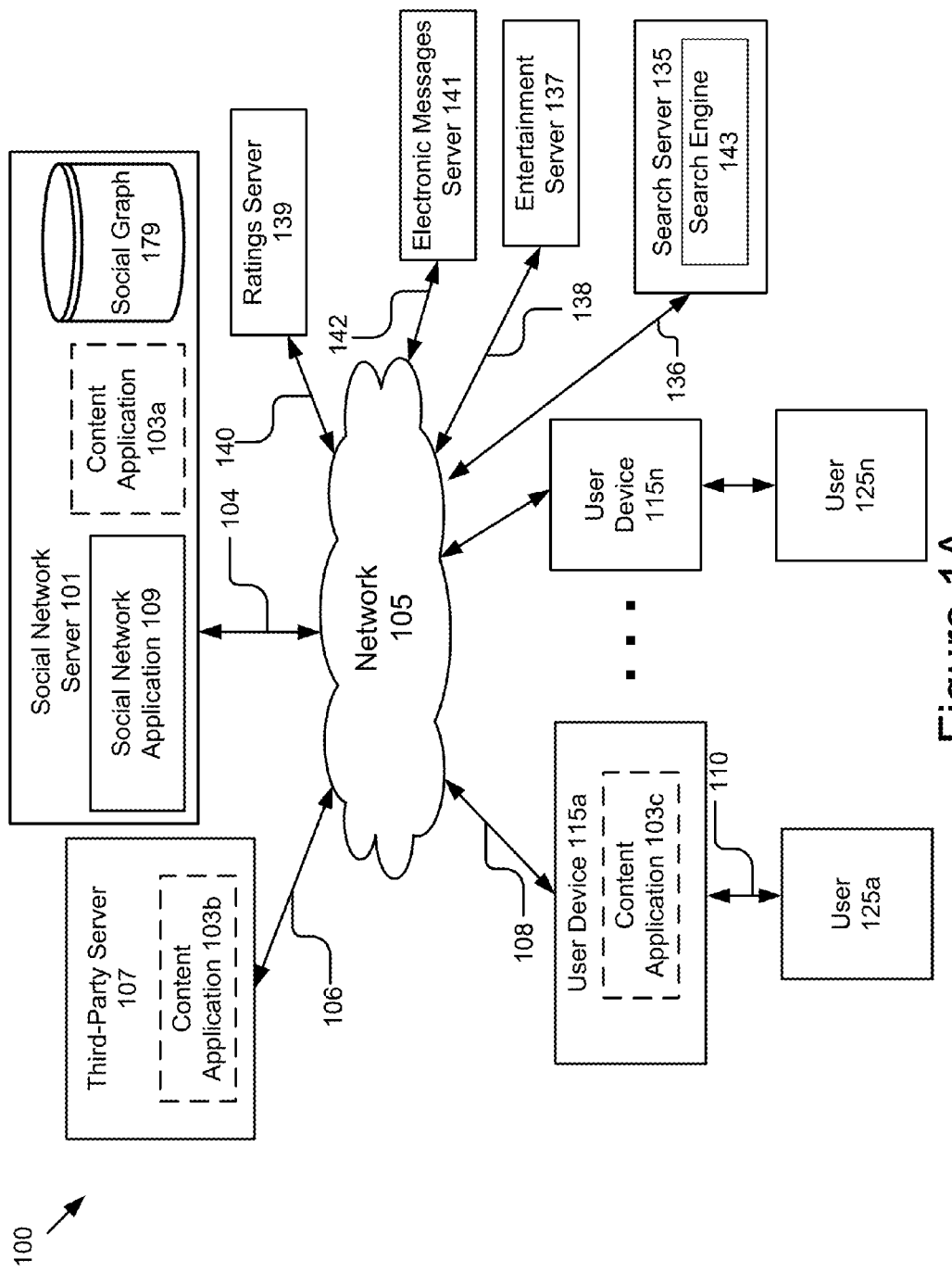
FIG. 1A is a block diagram illustrating an example system for generating a stream of content for display.

FIG. 1A illustrates a block diagram of a system 100 for generating a stream of content for display according to some implementations. The system 100 for generating a stream of content for display includes user devices 115*a* . . . 115*n* that are accessed by users 125*a* . . . 125*n*, a social network server 101, a third-party server 107, a search server 135, an entertainment server 137, a ratings server 139, an electronic messages server 141 and a social graph 179. In the illustrated implementations, these entities are communicatively coupled via a network 105.

In some implementations, the content application 103a is operable on the social network server 101, which is coupled to the network 105 via signal line 104. The social network server 101 also contains a social network application 109 and a social graph 179. In some implementations, the content application 103a is a component of the social network application 109. Although only one social network server 101 is shown, multiple servers may be present. A social network is any type of social structure where the users are connected by a common feature. The common feature includes friendship, family, work, an interest, etc. The common features are provided by one or more social networking systems, for example those included in the system 100, including explicitly-defined relationships and relationships implied by social connections with other users, where the relationships are defined in a social graph. The social graph is a mapping of all users in a social network and how they are related to each other.

In some implementations, the content application 103b is stored on a third-party server 107, which is connected to the network 105 via signal line 106. The third-party server 107 includes, for example, an application that generates a website that includes information generated by the content application 103b. For example, the website includes a section of embeddable code for displaying a stream of content generated by the content application 103b. Furthermore, while only one third-party server 107 is shown, the system 100 could include one or more third-party servers 107.

The user devices 115a . . . 115n in FIG. 1A are used by way of example. While FIG. 1A illustrates two devices, the description applies to any system architecture having one or more user devices. The user device 115a is any computing device that includes a memory and a processor, for example a personal computer, a laptop, a smartphone, a cellular phone, a personal digital assistant (PDA), etc. The user 125a interacts with the user device 115a via signal line 110. Although only two user devices 115a . . . 115n are illustrated, any number of user devices 115n are available to any number of users 125n.

The network 105 can be wired or wireless, and may have any number of configurations including a star configuration, token ring configuration or other configurations. Furthermore, the network 105 may comprise a local area network (LAN), a wide area network (WAN) (e.g., the Internet), and/or any other interconnected data path across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth communication networks or a cellular communications network for sending and receiving data including via short messaging service (SMS), multimedia messaging service (MMS), hypertext transfer protocol (HTTP), direct data connection, WAP, electronic messages, etc.

The content application 103 receives data and generates a stream of content for a user from heterogeneous data sources. In some implementations, the content application 103 receives data from a third-party server 107, a social network server 101, user devices 115a . . . 115n, a search server 135 that is coupled to the network 105 via signal line 136, an entertainment server 137 that is coupled to the network 105 via signal line 138, a ratings server 139 that is coupled to the network 105 via signal line 140, an electronic messages server 141 that is coupled to the network 105 via signal line 142. In some implementations, the search server 135 includes a search engine 143 for retrieving results that match search terms from the Internet.

In some implementations, the content application 103 generates a channel for a topic, receives candidate content items from heterogeneous data sources, generates a stream of content for the channel from the candidate content items and populates the channel with the stream of content for the channel. In some implementations, the content application 103 personalizes the channel for a user by rescoring the candidate content items for a user and generating a personalized content stream. For rescoring the candidate content items for a user, the content application 103 compares the candidate content items to a model. In some implementations, the content application 103 updates the model based at least in part on the user's selection and generates an updated content stream according to the updated model.

Figure 1B:
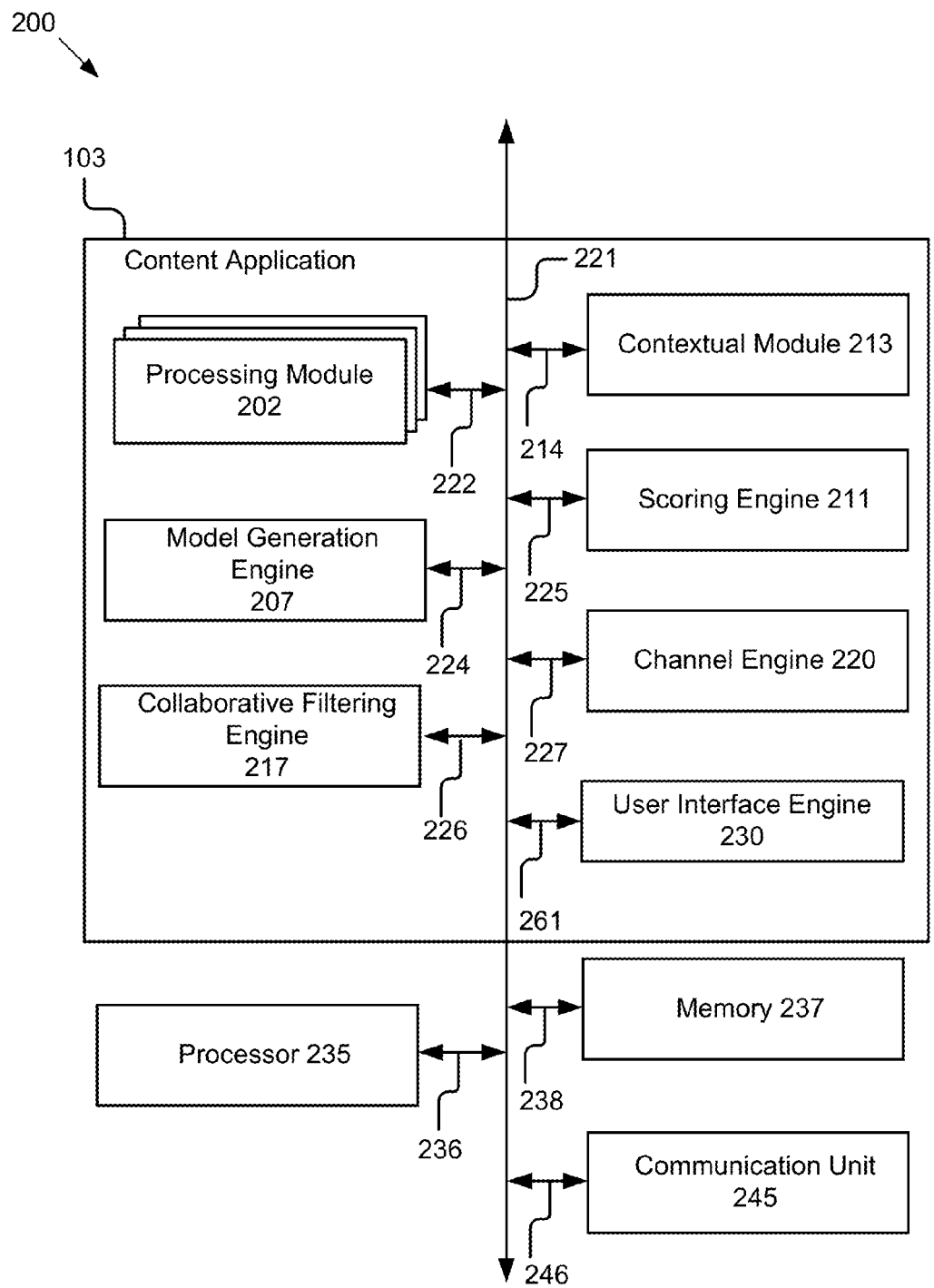
FIG. 1B is a block diagram illustrating an example content application.

Referring now to FIG. 1B, the content application 103 is shown in more detail. FIG. 1B is a block diagram of a computing device 200 that includes the content application 103, memory 237 and a processor 235. In some implementations, the computing device 200 is a social network server 101. In some implementations, the computing device 200 is a third-party server 107. In some implementations, the computing device 200 is a user device 115a.

Figure 2:
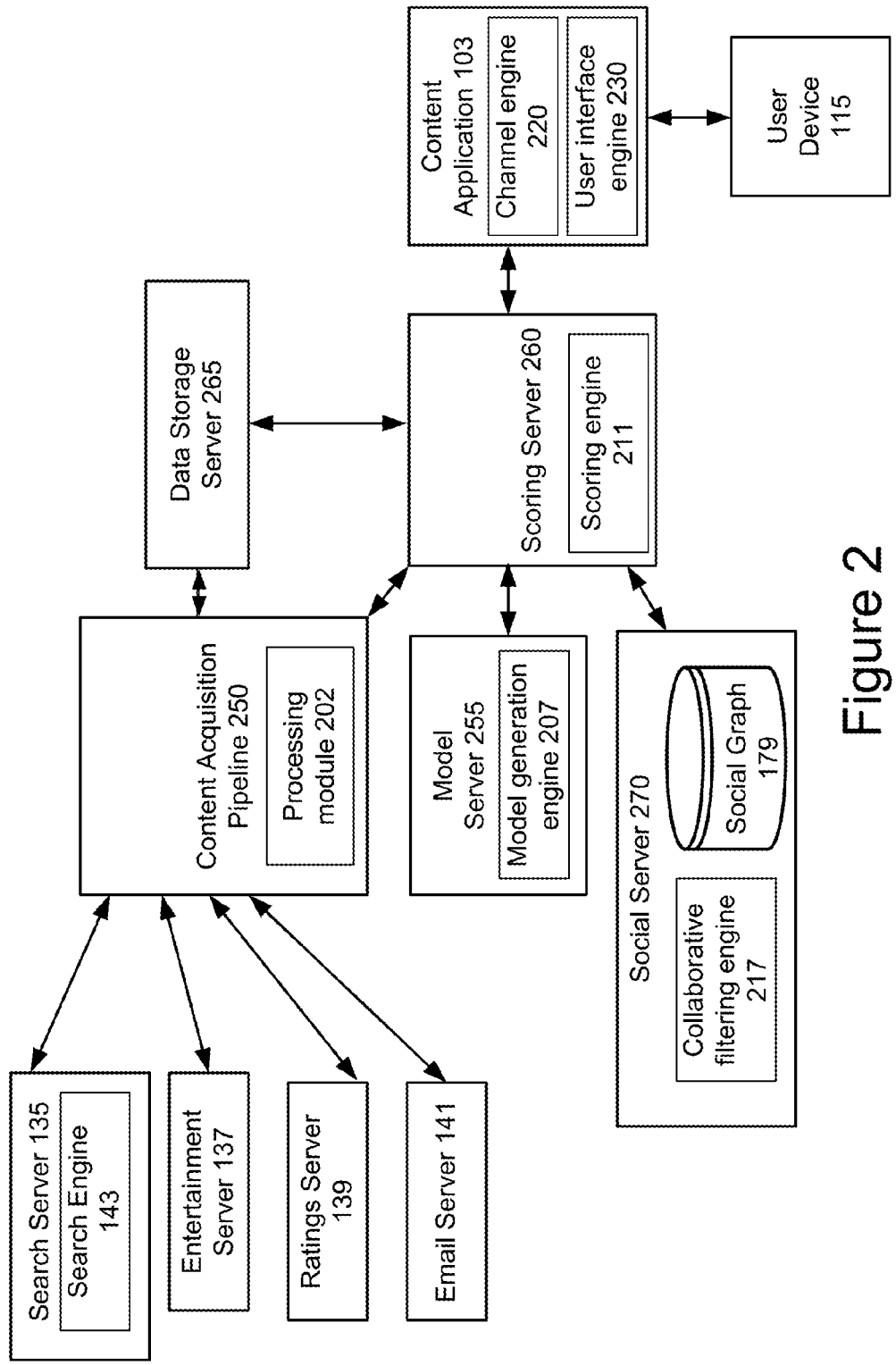
FIG. 2 is a block diagram illustrating another example system for generating a stream of content for display.

The processor 235 comprises an arithmetic logic unit, a microprocessor, a general purpose controller or some other processor array to perform computations and provide electronic display signals to a display device. The processor 235 is coupled to the bus 221 for communication with the other components via signal line 236. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature determination and sampling. Other processors, operating systems, sensors, displays and physical configurations are possible.

The memory 237 stores instructions and/or data that may be executed by processor 235. The memory 237 is coupled to the bus 221 for communication with the other components via signal line 238. The instructions and/or data may comprise code for performing any and/or all of the techniques described herein. The memory 237 may be a dynamic random access memory (DRAM) device, a static random access memory (SRAM) device, flash memory or some other memory device known in the art. In some implementations, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some implementations, the content application 103 comprises a processing module 202, a model generation engine 207, a contextual module 213, a scoring engine 211, a channel engine 220, a collaborative filtering engine 217 and a user interface engine 230.

The processing module 202 is software including routines for receiving information about a user's interests and social connections and for processing the information. In some implementations, the processing module 202 is a set of instructions executable by the processor 235 to provide the functionality described below for processing the information. In some implementations, the processing module 202 is stored in the memory 237 of the computing device 200 and is accessible and executable by the processor 235. In some implementations, the processing module 202 is adapted for cooperation and communication with the processor 235 and other components of the computing device 200 via signal line 222.

The processing module 202 receives information via the communication unit 245 about users from user input and/or prior actions of a user across a range of heterogeneous data sources including search (for example web, video, news, maps, alerts), entertainment (for example news, video, a personalized homepage, blogs, a reader, gadget subscriptions), social activity (for example interactions through electronic messages, profile information, text messaging including short message service (SMS), microblogs, geographical locations, comments on photos, a social graph 179 and other social networking information) and activity on third-party sites (for example websites that provide ratings, reviews and social networks where users indicate that they approve of content). This information is derived, for example, from a user's search history, browsing history and other interactions with the Internet.

In some implementations, there are multiple processing modules 202 that each receive data from a different heterogeneous data source. In some implementations, the data is received by the same processing module 202. The processing module 202 transmits the data to the memory 237 for storage. In some implementations, the memory 237 partitions the data from each heterogeneous data source in a separate data storage location. In some implementations, the data from heterogeneous data sources is stored in the same location in the memory 237. In some implementations, the memory 237 partitions the model and the stream of content into separate storage locations as well.

The model generation engine 207 is software including routines for retrieving the data from the memory 237 and generating a model for a user based on the data. In some implementations, the model generation engine 207 is a set of instructions executable by the processor 235 to provide the functionality described below for generating the model. In some implementations, the model generation engine 207 is stored in the memory 237 of the computing device 200 and is accessible and executable by the processor 235. In some implementations, the model generation engine 207 is adapted for cooperation and communication with the processor 235 and other components of the computing device 200 via signal line 224.

The model generation engine 207 receives user information from a variety of sources including, for example, queries, clicks, news clicks, gadgets, electronic message interactions, etc.; determines features from the information; and generates a model of the user based on the determined features. The model consists of various types of relevance of items to users, along with floating point values to indicate the extent to which the relevance holds. Examples include liking a source, a primary location, and a list of interests. The interests are generated from explicit information and inferred information. Explicit information is derived, for example, from a user's list of interests on a social network or indicating that they liked a particular content item. Inferred information takes into account a user's activities.

In some implementations, the model generation engine 207 also generates a model that contains several pieces of global meta-information about the user's consumption patterns including how frequently the user consumes the stream of content and global statistics on how likely the user is to reshare various types of items. Lastly, the model includes a sequence of weights and multipliers that are used to make predictions about the user's likelihood of clicking on, sharing or otherwise engaging with content stream items.

The model generation engine 207 generates the model from the data across the heterogeneous data sources. In some implementations, the model generation engine 207 builds extensions to the model that employ the patterns of behavior of other users. For example, the model predicts the user's behavior based on the reaction of similar users. The data for the other users can be anonymized before it is incorporated into the model.

In some implementations, the model generation engine 207 also updates a model based on the user's reaction to the stream of content. The user's reaction includes, for example, selecting a button for reading items that are similar to a content item that is part of the stream of content, removing an interest from the list of interests and choosing related interests. Responsive to the user's reaction, the model generation engine 207 updates the model. When the user selects the button for reading similar content items, the model generation engine 207 adds the corresponding interest to the model. When the user removes an interest from the list, the model generation engine 207 adjusts the model accordingly, e.g. by deleting the interest from the model.

The contextual module 213 is software including routines for identifying contextual clues from a request for a content stream for a user and from a request for a channel. In some implementations, the contextual module 213 is a set of instructions executable by the processor 235 to provide the functionality described below for identifying contextual clues. In some implementations, the contextual module 213 is stored in the memory 237 of the computing device 200 and is accessible and executable by the processor 235. In either embodiment, the contextual module 213 is adapted for cooperation and communication with the processor 235 and other components of the computing device 200 via signal line 214.

In some implementations, the contextual module 213 receives a request for a stream of content for a user or a request for a channel each time the user visits the website or activates an application that includes the content application 103. In some implementations, the user requests the stream of content or requests the content stream from the channel. In any case, the contextual module 213 receives the request and determines contextual clues from the request. For example, the contextual module 213 determines the location of the user (based, for example, on the user's IP address), the time of day and any other contextual clues. The contextual module 213 transmits the contextual clues to the scoring engine 211 via signal line 214.

The scoring engine 211 is software including routines for generating a stream of content for a user or a channel from candidate content items and for personalizing a channel for a user. In some implementations, the scoring engine 211 is a set of instructions executable by the processor 235 to provide the functionality described below for generating a stream of content for a user and for personalizing a channel for a user. In some implementations, the scoring engine 211 is stored in the memory 237 of the computing device 200 and is accessible and executable by the processor 235. In either embodiment, the scoring engine 211 is adapted for cooperation and communication with the processor 235 and other components of the computing device 200 via signal line 225.

In some implementations, the scoring engine 211 queries heterogeneous data sources for candidate content items related to search terms, receives the candidate content items and compares the candidate content items to the model to determine whether the user would find the candidate content items interesting. The heterogeneous data sources include a search engine 143, an entertainment server 137, an electronic messages server 141, a ratings server 139, a social network server 101 and a third-party server 107 as illustrated in FIG. 1A.

When the request is for a user, the query is derived from the user's interests, social connections and, in some implementations, recent search terms input by the user. When the request is for a channel, the query includes the topic and keywords for the channel. In some implementations, the scoring engine 211 also uses contextual clues transmitted from the contextual module 213 to further narrow the number of candidate content items.

In some implementations, the scoring engine 211 first performs the query and then compares the results to the model to determine whether the user would find them interesting. In some implementations, these steps are performed simultaneously. In yet another embodiment, the scoring engine 211 compares candidate content items to the model and then filters the results according to the subject matter of the queries.

The scoring engine 211 determines interestingness based on social relevance and an interest match between the item and the user. Social relevance can be used to measure a likelihood that the user would be interested in an item based on information from the user's social graph (e.g. how other people with similar demographics reacted to an item). For example, if the user is 13 years old and enjoys pop music, the user might be interested in content items about a new artist named Artist X. The interest match of the item to the user is determined based on similarity of the content item to the model.

Interestingness is measured by calculating a score for each candidate content item. In some implementations, the scoring engine 211 incorporates historical interaction feeds into the scoring. In some implementations, the candidate items are not displayed unless their candidate scores exceed a certain threshold. Once the scores are calculated and the threshold is exceeded, the scoring engine 211 generates a stream of content for a user that is ordered according to the candidate content item scores.

In some implementations, the scoring engine 211 also generates an explanation for each item in the stream of content for a user. The explanation is presented in a variety of ways including a tag that contains the subject matter of the content item (for example, skiing) or a more detailed explanation (for example, your friends enjoyed this article). Other explanations include that the content item matches a specific user interest or is similar to other content items that the user has liked in the past. The user's reaction to the explanation is used to further refine the model. This process is discussed in more detail below in connection with FIG. 3A, which illustrates a more detailed block diagram of the scoring engine 211.

In some implementations, the scoring engine 211 personalizes a channel for a user. The scoring engine 211 queries the channel for content items in the stream of content for the channels based on the topic of the channel. The scoring engine 211 receives candidate content items that match the query. In some implementations, the content items in the channel are directly transmitted from the channel engine 220 to the scoring engine 211. In yet another embodiment, the scoring engine 211 queries the data storage server 265 or the memory 237 for candidate content items based on the topic and keywords for the channel.

The scoring engine 211 compares the candidate content items to a model and calculates a score for each candidate content item using the model and based upon interestingness of the candidate content item to the user. In some implementations, the scoring engine 211 receives the contextual clues from the contextual module 213 and uses the contextual clues to further narrow the number of candidate content items.

In some implementations, the scoring engine 211 selects a set of content items from the candidate content items according to their scores. The scoring engine 211 identifies the content items in the selected content items and in the stream of content for the user, removes the duplicate content items from the selected set of content items and generates a stream of content for the channel (e.g., a personalized channel for the user) from the selected content items for a user. In some implementations, the scoring engine 211 distributes the personalized channel for the user into the overall content stream for the user.

Referring back to FIG. 1B, the collaborative filtering engine 217 is software including routines for generating additional candidate content items with a social component through collaborative filtering and transmitting the additional candidate content items to the scoring engine 211 that were derived from collaborative filtering. In some implementations, the collaborative filtering engine 217 is a set of instructions executable by the processor 235 to provide the functionality described below for generating additional candidate content items. In some implementations, the collaborative filtering engine 217 is stored in the memory 237 of the computing device 200 and is accessible and executable by the processor 235. In either embodiment, the collaborative filtering engine 217 is adapted for cooperation and communication with the processor 235 and other components of the computing device via signal line 226.

The collaborative filtering engine 217 obtains candidate content items that are socially relevant from a stream of content for a user derived from people with whom the user has a relationship and transmits the candidate content items to the scoring engine 211. The collaborative filtering engine 217 receives information about the relationships from the social graph 179. For example, the stream of content for a user is derived from friends in a social network or people that the user frequently sends electronic messages to. The more important that the person appears to be to the user, the more likely that the user will be interested in the content item. Thus, in some implementations, the collaborative filtering engine 217 applies a weight to candidate content items based on the social relationship of the user to the friend. For example, users that are friends receive higher weights than candidate content items from second-generation friends of the user (e.g. a friend of a friend).

The collaborative filtering engine 217 increases the weights applied to candidate content items from friends when the user positively responds to the items. For example, if the user comments on the item or indicates that the user found the item interesting, the collaborative filtering engine 217 increases the weight of that friend so that more candidate content items from that friend become part of the stream of content for the user.

The channel engine 220 is software including routines for generating a channel for a topic, retrieving candidate content items based on the topic and keywords, generating a stream of content for the channel from the candidate content items and populating the channel with the stream of content for the channel. In some implementations, the channel engine 220 is a set of instructions executable by the processor 235 to provide the functionality described below for generating the channel populated with the stream of content for the channel. In some implementations, the channel engine 220 is stored in the memory 237 of the computing device 200 and is accessible and executable by the processor 235. In either embodiment, the channel engine 220 is adapted for cooperation and communication with the processor 235 and other components of the computing device 200 via signal line 227.

In some implementations, the channel engine 220 determines a topic for a channel (e.g., a bicycler) and identifies corresponding keywords (e.g., bicycle, bike, bicycling, biking, cycle, cycling, racer). In some implementations, the channel engine 220 receives a request for creating a channel from third parties or individuals. The request for creating a channel includes a topic and possibly a brief description of the channel that the channel engine 220 uses to generate keywords. For example, the channel engine 220 receives a request for creating a channel for a topic about birds. In some implementations, the channel engine 220 determines the keywords for this channel of birds, for example birds, parrots, cockatiels, eagles, owls, pigeons, etc. The channel engine 220 generates a channel for the determined topic.

The channel engine 220 queries heterogeneous data sources for candidate content items based on the keywords, receives the candidate content items and selects a set of content items from the candidate content items according to their global scores. The heterogeneous data sources include a search engine 143, an entertainment server 137, an electronic messages server 141, a ratings server 139, a social network server 101 and a third-party server 107. The query is derived from the keywords associated with the topic. For example, the channel engine queries the search engine 143 for items including gourmet, cuisine and restaurant because the topic of the channel is gourmand.

In some implementations, the channel engine 220 first performs the query based on keywords and then selects the results according to their global scores. For example, the channel engine 220 selects a set of content items, each with a global score exceeding, e.g., more than a threshold amount, from the candidate content items. In some implementations, the query and selection are performed simultaneously, e.g., the channel engine 220 queries heterogeneous data sources for candidate content items based on the keywords and their global scores. For example, the channel engine 220 queries the data storage server 265 for items containing the word skiing and with global scores higher than a threshold amount. The data storage server 265 is described in greater detail below with reference to FIG. 2. In yet another embodiment, the channel engine 220 selects from the candidate content items based on their global scores and then filters the results according to the keywords. In many of these examples, the channel engine 220 receives a set of candidate content items related to the topic that is popular.

The channel engine 220 generates a stream of content for the channel using the selected content items and populates the channel with the stream of content for the channel. Once the channel is created, the channel engine 220 transmits the stream of content for the channel to the user interface engine 230 for incorporation into a user interface that is displayed to users. In some implementations, the stream of content is stored in the memory 237 for a data storage server 265.

In some implementations, the channel engine 220 updates the channel periodically (e.g., every hour, day, week or month) and invites and accepts people to join the channel as members/users. In some implementations, the channel engine 220 also receives input or activities from users through the user interface engine 230 and publishes these activities in the channel.

In some implementations, the channel engine 220 determines a reputation for each user in the channel based on reactions to the user's submitted content and according to a level of satisfaction of some rules. The channel engine 220 assigns a reputation to users indicating that they are trustworthy when the users submit content that a threshold number of other users read, watch or positively react to by submitting comments or providing indications of approval for the content. For example, the channel engine 220 assigns a high reputation indicating trustworthiness when the user exceeds a threshold. In another example, the channel engine 220 assigns a low reputation indicating trustworthiness when the user exceeds a threshold.

The channel engine 220 determines whether to publish content items submitted by the users in the channel based on the reputations of the users and arranges the content items in the stream of content for the channel according to a ranking of the content. In some implementations, the channel engine 220 automatically publishes the content items submitted by users with high reputations in the channel. In some implementations, the channel engine 220 asks a moderator or a user with a high reputation for approval to publish content items from users with low reputations.

The channel engine 220 also deletes obsolete content items and items older than a certain period of time, for example a month. In some implementations, the channel engine 220 identifies the content items in the stream of content for the channel and in a stream of content for a user as well, removes duplicate content items from the stream of content for the channel and distributes the stream of content for the channel into the stream of content for the user. In some implementations, the channel engine 220 transmits the stream of content for the channel to the scoring engine 211 to remove the duplicates.

In some implementations, the channel engine 220 further refines the topic of the channel based on the activities of the users. In some implementations, the channel engine 220 divides a channel into two or more channels with related topics. For example, the channel engine 220 creates two new channels from the gourmand channel: for vegetarian gourmands and another for carnivorous gourmands. In some implementations, a new channel with a narrowed topic is derived from a current channel based on user feedback. In some implementations, the channel engine 220 generates a new channel for a narrowed topic, for example a sushi channel generated from a gourmand channel.

A public stream of content with multiple users is referred to as a channel and is available for other users. The users join the channel and the channel appears as part of a user's stream of content. In some implementations, the channel is a bucket and each time a content item is placed in the bucket, the channel engine 220 automatically routes the item to the user. In some implementations, the user selects the channel button generated by the user interface engine 230 to view the items in the bucket.

There are three different ways to implement a channel: (1) an algorithmic channel; (2) a moderated channel; and (3) an un-moderated channel. The user inputs information for creating an algorithmic channel by specifying different entities and sources (e.g. 5, 15, 20, etc.) that collectively pull together content about a particular interest. Other users subscribe to the channel by following it or indicating that they approve of the stream of content. Other implementations are possible. For example, a channel can be a mix of two or more of the ways described.

For a moderated channel, at least one moderator is specified. In some implementations, the creator of the channel is automatically designated as a moderator. Other moderators are designed via the user interface. The user interface engine 230 presents the moderator with candidate content items to include in the channel from various places including items that match a query for the specified interest and other users. When the moderator approves a candidate content item, it appears in the content stream for the channel. Other users offer content to the channel by indicating that they approve of an item in their content stream. Content items from other users are designed as candidate content items until the moderator approves or rejects them.

For an un-moderated channel, any user can join the channel and add an item to the channel's content stream by approving of an item. Approved items are sorted by their global scores and subsequently modified in response to the item receiving many views, indications of approval and comments from users that are members of the channel. By rearranging the content items according to user responses, the stream of content of the channel is effectively moderated.

The user interface engine 230 is software including routines for generating instructions for displaying a user interface on a user device 115 that includes the stream of content for a user including an overall stream of content and a channel stream of content, receives user feedbacks, allows the user to add or remove explicit interests and generates a widget for display on websites that include an option to share the articles in the channel. The user interface can be displayed as part of another application, for example a social network, or as its own standalone application. In some implementations, the user interface engine 230 is a set of instructions executable by the processor 235 to provide the functionality described below for providing a stream of content for a user or a channel. In some implementations, the user interface engine 230 is stored in the memory 237 of the computing device 200 and is accessible and executable by the processor 235. In either embodiment, the user interface engine 230 is adapted for cooperation and communication with the processor 235 and other components of the computing device 200 via signal line 261. In some examples, the user interface engine 230 also provides suggestions for channels that the user could join.

FIG. 2 is a block diagram illustrating another embodiment of a system for generating a channel for display. In this embodiment, the components of the content application 103 are divided among various servers so that the information is efficiently processed. The system includes a search server 135, an entertainment server 137, a ratings server 139, an electronic messages server 141, a content acquisition pipeline 250, a data storage server 265, a model server 255, a scoring server 260, a social graph 179, a social server 270 and a content application 103.

The heterogeneous data sources (e.g., the search server 135, entertainment server 137, ratings server 139 and electronic messages server 141) are crawled by a content acquisition pipeline 250. In some implementations, the heterogeneous data sources transmit the content items to the content acquisition pipeline 250.

The content acquisition pipeline 250 includes a processing module 202 for annotating the content items with specific tags, for example features and a global score that was generated by the scoring engine 211 and processes the data about user activities. The activities described herein are subject to the user consenting to data collection. Once the content items are annotated, the processing module 202 transmits the data to the data storage server 265. The data storage server 265 indexes the features of each content item and stores them in at least one database. In some implementations, the content items are organized according to an identification format (SourceType#UniqueItemID, for example, "VIDEOSERVICE#video_id" and "NEWS#doc_id"), an item static feature column that holds an item's static features (for example, title, content, content classification, etc.), an item dynamic feature column that holds an item's dynamic features (for example, global_score, number of clicks, number of following, etc.), a source (src) static feature column where the source is a publisher of an item (for example, Newspaper A in news, video uploading in YouTube, etc.), a src dynamic feature column holds the source's dynamic features, a content column holds activities that were used to create activities and a scoring_feature holds a message that is used for user scoring.

In some implementations, the data storage server 265 dynamically phases out the content items. For example, news items expire after 24 hours, videos expire after 48 hours and feeds are kept for 24 hours or only the 10 most recent items are kept, while the rest of the items are phased out, whichever is larger.

The content acquisition pipeline 250 also transmits the content items to the scoring server 260 for a global user ranking. The global scores are transmitted from the scoring server 260 to the data storage server 265, which stores the global scores in association with the content items. The global scores are helpful for organizing the content items in the data storage server 265.

Turning now to the model server 255, the model server 255 receives the user activity from the processing module 202 or the data storage server 265. The model generation engine 207 generates the model based on user input and/or prior actions. The model server 255 transmits a model to the scoring server 260 periodically or upon request.

In some implementations, the scoring server 260 requests the model responsive to receiving a request for a stream of content for a user or a request for a channel from the user. The scoring server 260 receives the model from the model server 255. The scoring server 260 requests and receives user candidates from the social graph 179. The scoring server 260 requests and receives candidate content items from the data storage server 265. The scoring server 260 requests and receives candidate content items from people that the user is connected to in the social graph 170 from the collaborative filtering engine 217 that is stored on the social server 270. The candidate content items from the social server 270 are pre-scored and, in some implementations, the unread candidate content items are saved to a cache on the social server 270. These items are saved to a cache because the quantity of social updates can be large enough that performing the scoring during write time enables faster reads.

The scoring engine 211 compares the candidate content items to the model and scores the candidate content items. In the case of candidate content items from the social server 270, the scoring engine 211 receives the candidate content items from the social server 270, compares the candidate content items to the model and rescores the candidate content items according to the model. The scoring engine 211 generates a stream of content for a user based on the scored candidate content items and transmits the stream of content for a user to the content application 103.

The content application 103 includes a channel engine 220 as described above and a user interface engine 230 that receives the stream of content for a user from the scoring server 260 and displays it in a user interface. In some implementations, the user interface engine 230 generates a widget for display on third-party websites that allows a user to share content with the channel. Additionally, the user interface engine 230 provides the user with a user interface for changing the settings and modifying user interests. The buttons will be explained in greater detail below with regard to FIG. 4-8.

Figure 3A:
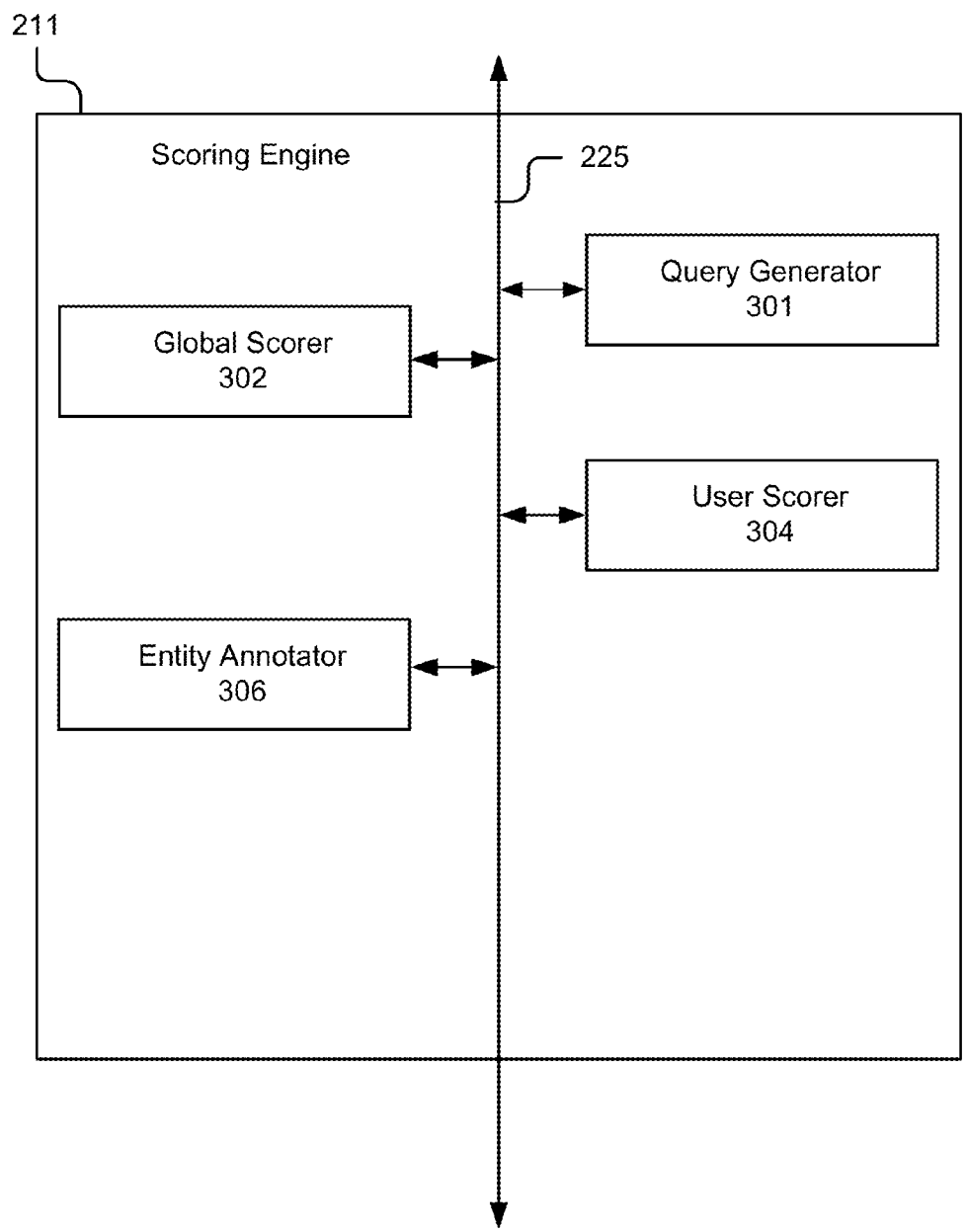
FIG. 3A is a block diagram illustrating an example scoring engine in more detail.

Referring now to FIG. 3A, some implementations of a scoring engine 211 is shown in more detail. This embodiment is discussed in conjunction with FIG. 2. The scoring engine 211 includes a query generator 301, a global scorer 302, a user scorer 304 and an entity annotator 306 that are each coupled to signal line 225.

The global scorer 302 is used to rank all content items that are stored in the data storage server 265 or memory 237 (depending upon the embodiment). The global scorer 302 uses signals from the different verticals and the data that are processed by the processing module 202 to compute a global user-independent score for each content item to approximate its popularity or importance within the stream that produced it. The global scorer 302 normalizes the score across streams so that items from various streams are comparable to aid in generating a quick yet reasonable ranking of items. The global score is a combination of its quality specific to the source stream (depending on the rank of the source, number of known followers of a source, etc.) and its global popularity (trigger rate on universal search, relevance to trending queries, number of clicks, long clicks received, etc.).

The global scorer 302 transmits the global score to storage where it is associated with the content item. The global score helps rank the content items for faster retrieval. For example, if the query generated by the query generator 301 includes a request for the top ten items about skiing, those items are already organized in the data storage server 265 or memory 237 according to the global score.

The query generator 301 generates a query for users that would find a content item interesting. There are two types of queries: an interest-based query suggests users based on their interest in the item and a social-based query suggests users based on their social connection to the item.

An interest-based query identifies a candidate content item as interesting to the user if it exceeds a quality threshold based on the user's interest. The quality threshold contains components covering the global quality of the item, and the quality with respect to the user's location, as well as optionally a set of additional quality scores for example the burstiness and geo-burstiness of the item. Burstiness refers to the extent to which the item's popularity has sharply increased. Geo-burstiness refers to the extent to which the item's popularity has sharply increased compared to average activity in a specific geographic area.

The following is one form of the query associated with a user: ((llama_farming AND (global_score>\# OR local_score>\# OR burstiness>\#)) OR (from_techwebsite AND (global_score>\# OR local_score>\# OR burstiness>\#)) OR ( . . . ). The user may be moderately interested in llama farming and good material on this subject may be hard to find, yielding a relatively low threshold on global score and the other scores. The user is less interested in content from the technology website and this content is higher in both volume and quality, so the resulting threshold is higher to gate the technology website content to an appropriate flow rate. These thresholds are recomputed nightly based on the activity during the day.

The query is transmitted to the social graph 179 and the user scorer 304 receives the candidate content items from heterogeneous data sources through the content acquisition pipeline 250 or the data storage server 265 and receives the list of users associated with the candidate content items from the query generator 301. In some implementations, the user scorer 304 receives candidate content items directly from the source, for example, from a microblog. The user scorer 304 then computes a score for a single user and item pair based on the model, including user preferences for various types of content items, including suitable multipliers for the scoring model and the complete description of the item, including the entities it refers to, its various popularity signals (for example, global and geo-specific popularity, both in absolute terms as well as in the rise in popularity).

In some implementations, the query generator 301 also generates queries for the users who want a channel shown in their user interfaces. The queries are used to retrieve content items from channels based on the topic. For example, when a user wants a channel of sharks displayed, the query generator 301 generates queries that include sharks and other terms for sharks.

In some implementations, the user scorer 304 generates an activity identification, a user identification, an action type (e.g. recommendation of candidate content item for stream of content), a score, a score version, a score timestamp, a stream type (e.g. Video Source, feed, news, SMS, etc.), a stream source (e.g. Newspaper X, School Y, etc.) and a bloom filter.

In some implementations, the user scorer 304 employs a probabilistic method that evaluates the probability that an item will be present in a user's stream. The random variables used to compute this probability is the lattice of various subsets of properties (entities, global and local scores, source type, source, etc.) shared between the item and the user. For a suitably rich set A of attributes, the random variable "item" is independent of the random variable "user," given the values of the attributes A. Thus for any setting $\{A=a\}$ of the attributes, $Pr(item|A=a, user)=Pr(item|A=a)$. Therefore, summing over all possible values a of A, obtains $$Pr(item \mid user) = \sum_p Pr(item \mid p)(Pr(p \mid user),$$

where p is a property, that is, a setting A=a of the attributes. The latter quantity, Pr(p|user), is something we can approximate from the user's history of interactions with content items as well as user search history and other opt-in data. Similarly, the former quantity, Pr(item|p) is something we can approximate by the (suitably weighted) reciprocal of the number of items with property p (e.g. if it is expected that p=(llama_farming AND (global_score>\# OR local_score>\# OR burstiness>\#) to generate 300 items, take Pr(item|p) to be 1/300).

The difficulty of computing Pr(item|user) by the sum above is that the properties expressed in the query corresponding to the user are not independent, and may have correlations to take advantage of. To support this, the user scorer 304 begins with very simple approximations of the following form as a first step:

$$Pr(item|user) = G^{-1}\left(\sum_p G(Pr(item|p)Pr(p|user))\right),$$

where the properties p are summed over single-attribute properties (as opposed to all possible settings of an entire collection of attributes), and G is an exponential function of the form $G(x)=2^{(100\ x)}$, so that when applied in this form, if there are several values of p for which Pr(item|p) Pr(p|user) is large, the sum of their G-values slowly increases.

Referring back to FIG. 3A, the entity annotator 306 generates descriptions for each content item. In some implementations, the entity annotator 306 generates a description for all content items that are stored in the data storage server 265 in association with the content item. In some implementations, the entity annotator 306 generates an explanation for why items were included in the stream of content for a user based on the user's interests. The explanations are categorized as social (your friend liked/shared/commented on this), entities (because you like monster trucks), queries (because you search for/are interested in [P-38 lightning model airplanes]) and geographic. In some implementations, the entity annotator 306 incorporates collaborative explanations (because people from school Y/Company G/etc. liked this) and some named collaborative explanations (because your brother likes a comic).

The entity annotator 306 also generates a feedback mechanism that is displayed with the explanation, for example like or dislike; approve or disapprove, etc. In some implementations, the explanation is displayed as a decision tree from a broad subject area to narrower subject areas.

The stream of content for a user is displayed in a user interface that allows the user to share the item with friends, comment on the item, save the item, etc. By sharing the content items with friends, the stream of content for a user is circulated throughout the social network. In some implementations, the scoring engine 211 automatically distributes content items to friends based on a determined commonality, for example sharing pictures of the user's friends with all family members. As a result, a user's stream of content becomes a combination of information retrieved from websites and content obtained through friends. This keeps the content interesting and the results fresh.

When a user responds to the explanation by providing feedback, the feedback is transmitted to the model generation engine 207 for incorporation into the data that are processed by the processing module 202 and, as a result, the model. The feedback loop establishes a dynamic model, which is important for two reasons. First, feedback helps train the model when generating the model for the first time. The model is created in part from inferences and these inferences can be wrong. Feedback helps create the most accurate model possible. Second, peoples' interests change and incorporating the feedback makes the model evolve to reflect those changes. For example, a user's taste in music changes such that the user is interested in a particular artist now because the artist is new but eventually the user will become bored of the artist's music or find better artists. As a result, there will be a point where the user is no longer interested in seeing content items about that particular artist. Incorporating user feedback into the model therefore makes the model stay relevant to the user.

Figure 3B:
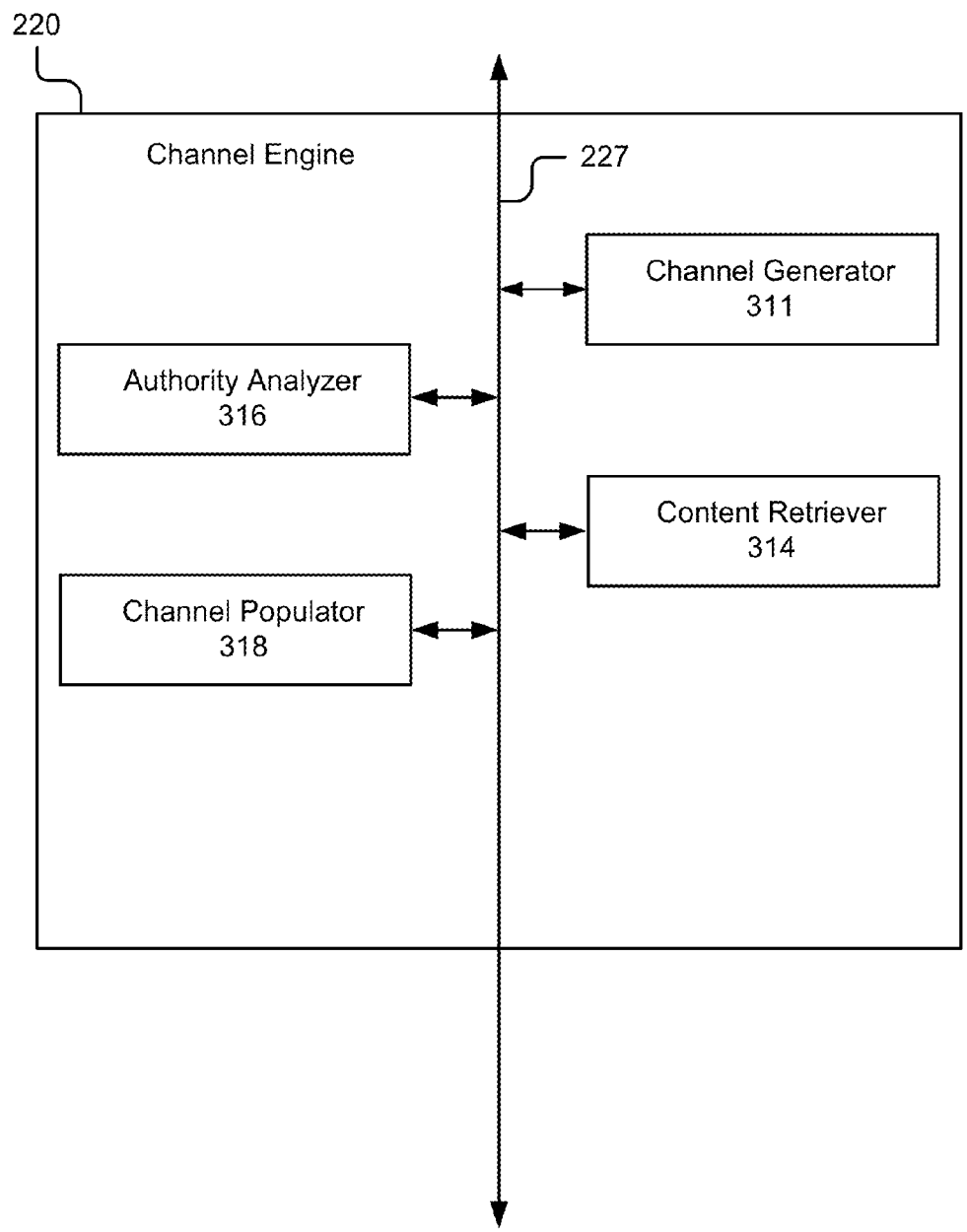
FIG. 3B is a block diagram illustrating an example channel engine in more detail.

Turning now to FIG. 3B, some implementations of a channel engine 220 is shown in more detail. This embodiment is discussed in conjunction with FIG. 2. The channel engine 220 includes a channel generator 311, a content retriever 314, an authority analyzer 316 and a channel populator 318 that are each coupled to signal line 227.

The channel generator 311 creates and manages channels by determining a topic and identifying keywords that correspond to the topic. In some implementations, the channel generator 311 queries heterogeneous data sources for the most popular topics or determines topics from the content items with global scores that exceed a threshold amount stored in the data storage server 265 or memory 237 (depending on the embodiment). For example, the channel generator 311 creates a topic for fashionistas from the search history for a period of time. In some examples, the content items with global scores exceeding a threshold (e.g. scores indicating popularity or importance) is about artist P and then the channel generator 311 determines a topic of the artist P.

In some implementations, the channel generator 311 first determines a topic and then determines the keywords related to the topic. In some implementations, the channel generator 311 first determines keywords from the popular content items, categorizes the keywords and then determines a topic from each category of the keywords. For example, the popular keywords include stroller, diaper and preemie. From these keywords, the channel generator 311 identifies the topic as babies.

In some implementations, the channel generator 311 receives requests for creating channels from third parties or individuals. The request contains a topic and, in some examples, a brief description of the topic. The channel generator 311 then generates a channel for the topic and determines the keywords for the topic based on synonyms and the brief description if present.

The channel generator 311 maintains a list of members associated with a channel. In some implementations, the channel generator 311 adds any user to the group that wants to join. In some implementations, the channel generator 311 transmits requests to join to a moderator that approves the request before the user is added to the group.

In some implementations, the channel generator 311 receives user profiles and generates a recommendation for users to join channels that include a topic or keyword that matches or is similar to the user profile. For example, a user that includes biking as an interest might be interested in a channel for mountain biking. The channel generator 311 transmits the recommendation to the user interface engine 230, which provides the recommendation to the user via the communication unit 245.

In yet another embodiment, a user seeds the channel by submitting content items to the channel generator 311. The channel generator 311 identifies the topics of the content items and adds the topics to the channel topics and keywords. The channel generator 311 then transmits the content items to the channel populator 318 for incorporating the content items into the stream of content.

The content retriever 314 generates queries based on the topic and keywords. In some implementations, the queries also include global scores associated with content items. For example, the following is one form of the query for the topic of gourmand: ((from_foodiewebsite AND global_score>#) OR burstiness>#) OR (béchamel AND global_score>#) OR ( . . . )). In some implementations, the content retriever 314 queries heterogeneous data sources for candidate content items based on keywords and then selects a set of content items with global scores higher than a threshold from the candidate content items. In yet another embodiment, the content retriever 314 generates queries only including a global score higher than a threshold and then retrieves the content items containing the keywords from the results of the first query.

Once the channel generator 311 creates the channel, the content retriever 314 periodically generates queries and receives candidate content items for feeding the channel. In some implementations, the content retriever 314 also updates the keywords and the queries periodically, for example once a week, to accommodate the changing trends. For example, the content retriever 314 adds keywords that recently became popular, removes keywords for outdated trends and adjusts the global score threshold for each group of content items to reflect the changes. In the example of gourmand, the query becomes ((from_foodiewebsite AND global_score># OR burstiness>#) OR (béchamel AND global_score>#) OR (sushi AND global_score>#) OR ( . . . )). Because sushi is a trending toping, sushi is added as a keyword and, as a result, the content retriever 314 adds sushi to the query. Similarly, béchamel is becoming a more popular topic, so the threshold for content items related to béchamel is adjusted lower to get a higher flow rate of the content items related to béchamel.

The authority analyzer 316 receives the activities of members of the channels. In some implementations, the authority analyzer 316 categorizes the activities into two groups: user-submitted content items and responses to existing content items. In some implementations, the authority analyzer 316 also identifies a user-submitted content item as original or transferred from other data sources. In some implementations, the authority analyzer 316 labels the content items according to its media type, for example, video, an image, music, a blog post, an article, a message, a microblog post, news etc. The authority analyzer 316 weights each content item according to the closeness of a content item to the channel topic and keywords, originality and media types. The weights become associated with the user's reputation and a high weight results in a reputation for being trustworthy or, in another example, a low weight results in a reputation for being trustworthy. For example, the user who submits an original item obtains more weights than the user who transfers an item from elsewhere. The authority analyzer 316 publishes the user-submitted content item based on the weights assigned to the content item and the user's reputation.

In some implementations, the authority analyzer 316 generates and updates a reputation for each user in the channel based on reactions to user submitted content. The factors used to determine a user's reputation include a number of users that read, watch or comment on the user's submitted content items. For example, the authority analyzer 316 assigns a more trustworthy reputation to a user that submits videos, pictures, posts or shares articles that are viewed by more than 200 people versus a user that submits content items that are viewed by 100 people. The first user is deemed to be a better identifier of popular content items. Similarly, a number of comments submitted by other users and a number of indications of approval of the content items submitted by the user are also used to rate each user in the channel. The reputation of a user is proportional to the number of members that interact with the submitted items by reading, watching (e.g. in the case of videos) or participating with the item by commenting or indicating approval.

In some implementations, the authority analyzer 316 assigns a reputation level to each user in the channel. For example, the authority analyzer 316 assigns a low, medium or high reputation to the user. In some implementations, the authority analyzer 316 also uses the weights associated with the user-submitted items to determine a reputation for the user. In some implementations, the authority analyzer 316 determines the reputation level by scoring the user. For example, a higher reputation is associated with a score higher than 100. In some implementations, the authority analyzer 316 assigns the user a badge to indicate the user's reputation, for example, in the form of a star. The more stars the user has or the brighter color of the star, the more trustworthy reputation is. In some implementations, the badges include high rank badges or low rank badges, for example a gold badge represents a higher rank than a silver one. In some implementations, the badge is generated from all user activity, e.g. a reaction to all user-submitted content items across channels.

In this example, a major concern is to prevent people from spamming a channel and a user is unlikely to spam one group but not another group. In some implementations, the badge is specific to each channel. In this example, the badge is associated with a group so that people with an amateur interest in a subject are not clogging up a content stream with irrelevant content that would annoy more experienced members.

The authority analyzer 316 ranks each candidate content item based on the reputation of the user who submits the candidate content item and arranges the candidate content items according to the ranking. In some implementations, the authority analyzer 316 asks a moderator or a user with a trustworthy reputation for approval to publish content items from a user with an untrustworthy reputation. In some implementations, the authority analyzer 316 automatically includes the content items submitted by users in the set of the candidate content items as long as the content item exceeds a threshold global score. The authority analyzer 316 transmits the arranged candidate content items to the channel populator 318.

In some implementations, the channel populator 318 receives the candidate content items from the content retriever 314, arranges the items according to their global scores, generates a stream of content for the channel using the candidate content items and populates the channel with the stream of content for the channel. In some implementations, the channel populator 318 receives arranged candidate content items from the authority analyzer 316, generates a stream of content for the channel using the arranged candidate content items and populates the channel with the stream of content for the channel.

In yet another embodiment, the channel populator 318 receives a variety of content items from the channel generator 311 that a user submitted to seed the channel. In some implementations, the user submits items at the creation of the channel to help define the topic and keywords. In some implementations, the user periodically submits additional items to ensure that the topic and keywords stay relevant.

In some implementations, the channel populator 318 deletes obsolete content items or items older than a period of time, for example a week, from the stream of content for the channel. The channel populator 318 updates the stream of content for the channel accordingly. The channel populator 318 transmits the stream of content for the channel to the data storage server 265 or the memory 237 (depending on the embodiment) for storage.

In some implementations, the channel populator 318 identifies content items in the stream of content for the channel and in the stream of content for a user, removes duplicate content items from the stream of content for the channel and distributes the stream of content for the channel into the stream of content for the user. In some implementations, the channel populator 318 transmits the stream of content for the channel to the scoring engine 211 for the scoring engine 211 to remove the duplicates and distribute the stream of content for the channel into the stream of content for the user.

In some implementations, other users can subscribe to a particular user's personalized stream of content using the channel engine 220. People might find this feature particularly interesting if the user is a celebrity. For example, people interested in technology would enjoy reading a stream of content that is about technology and is personalized for the founder of a large technology company. This would give users insight into what type of nuanced content the founder finds interesting.

The stream of content is public or private. A public stream of content is viewable by other users. A stream of content is made public when a user chooses to make the stream public. In some implementations, the user interface engine 230 generates a link that the user can share with other members to access the user's public stream of content. In some implementations, the public stream of content is viewable by other users from a profile page. This is especially appealing for users that want to learn more about public figures. For example, a user may be interested in viewing what a celebrity has chosen to put in his public stream of content.

Users have several options for how the stream of content (e.g., an overall stream of content and a channel stream of content) is configured. In some implementations, the full content stream is included. The user interface engine 230 includes options for restricting the content stream, for example, the user interface engine 230 includes buttons in the user interface for restricting results to a single entity, source or media type (videos, music videos, images, news, etc.). The user interface engine 230 also includes an option for modifying the number of results for an interest.

In some implementations, the user interface engine 230 includes a button in the user interface for creating different streams of content. The streams of content contain particular sets of interests. For example, the scoring engine 211 creates a stream of content for all news items and a separate stream of content for gossip items responsive to the user's interaction with the button. In some implementations, the scoring engine 211 organizes the streams of content by creating a favorite list of the content streams if the user selects a button for creating a favorite list. From the favorite list of the content streams, the user accesses all the streams of content that the scoring engine 211 has created for the user, the scoring engine 211 has subscribed the user to, etc. The stream of content is stored as a repeated feature message, which flows through a query builder to generate content for the stream of content. The stream of content is then stored in a data structure, for example, a small content stream binary tree or a database for rapid prototyping.

Figure 4A:
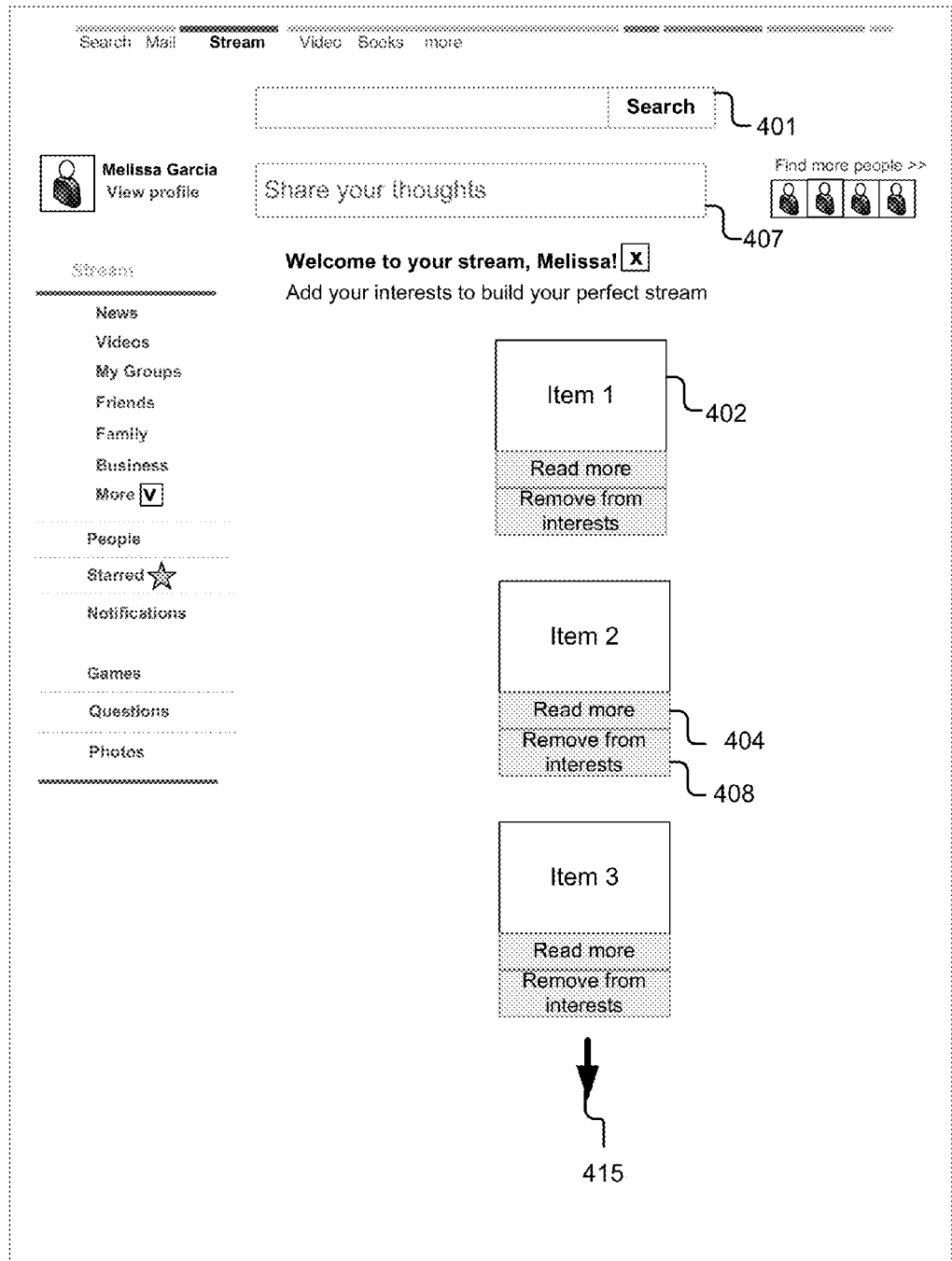
FIG. 4A is a graphic representation of an example user interface that includes content items that are categorized by interests.

FIG. 4A is a graphic representation of an example user interface 400 that includes content items that are categorized by interests. In this example, the scoring engine 211 generates a stream of content for a user based on a model for the user. In some implementations, the channel engine 220 adds items to the stream of content. In yet another embodiment, the user interface 400 is a setup for a moderator to configure a channel with specific interests. The user interface engine 230 transmits requests for content items to the scoring engine 211 in response to receiving a request from the user through the search bar 401. The user interface engine 230 posts content from the user to the user interface 400 in response to receiving input through the text box 407.

The stream of content comprises selected content items. The selected content items are displayed vertically. The user can view additional content items by selecting the down arrow 415. An example of different interests are cooking, biking and reading. Item 1 402 could therefore be a video on how to cook vegan chili. Item 2 could be a news article about the increase in people who use bikes to commute to work. Item 3 could be a friend's post about her top ten favorite books.

The user modifies the list of user interests by selecting the "read more" button 404. This causes the model generation engine 207 to add the interest associated with the item in the stream of content to the list of interests for the model. Selecting this button also causes the user interface to include similar content items. When the user selects the "remove from interests" button 408, the model generation engine 207 explicitly removes the interest from the list of interests associated with the user. Removing an interest from the list will create an instruction in the model to not serve the user with the particular interest.

Figure 4B:
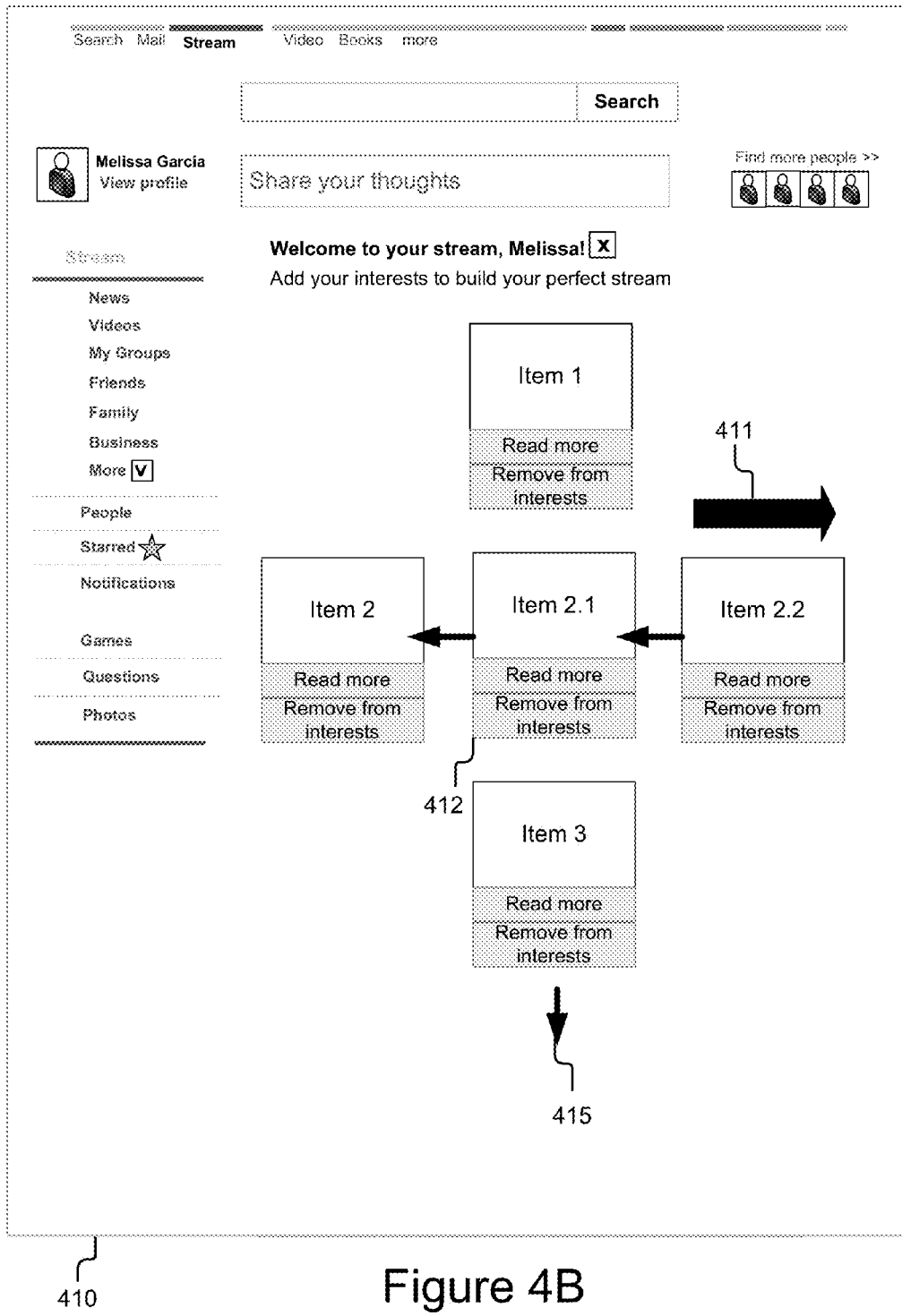
FIG. 4B is a graphic representation of an example user interface that includes a response to a user selecting a "read more" button.

FIG. 4B is a graphic representation of an example of a user interface 410 that includes a response to a user selecting the "read more" button 404 for item 2 in FIG. 4A. Responsive to user selecting the button, the user interface engine 230 expands the items on a horizontal axis to display multiple items associated with an interest. In some implementations, the user interface engine 230 includes a large arrow 411 in the user interface 410 for advancing the items on the horizontal axis. Selecting the large arrow 411 in the user interface 410 causes the items to move from right to left to advance to the next item in the content stream. In some implementations, the user interface engine 230 works with the user device 115 and its peripheral devices so that selecting the arrows on a keyboard is a shortcut for advancing items on the horizontal and vertical axes in the user interface 410.

Figure 4C:
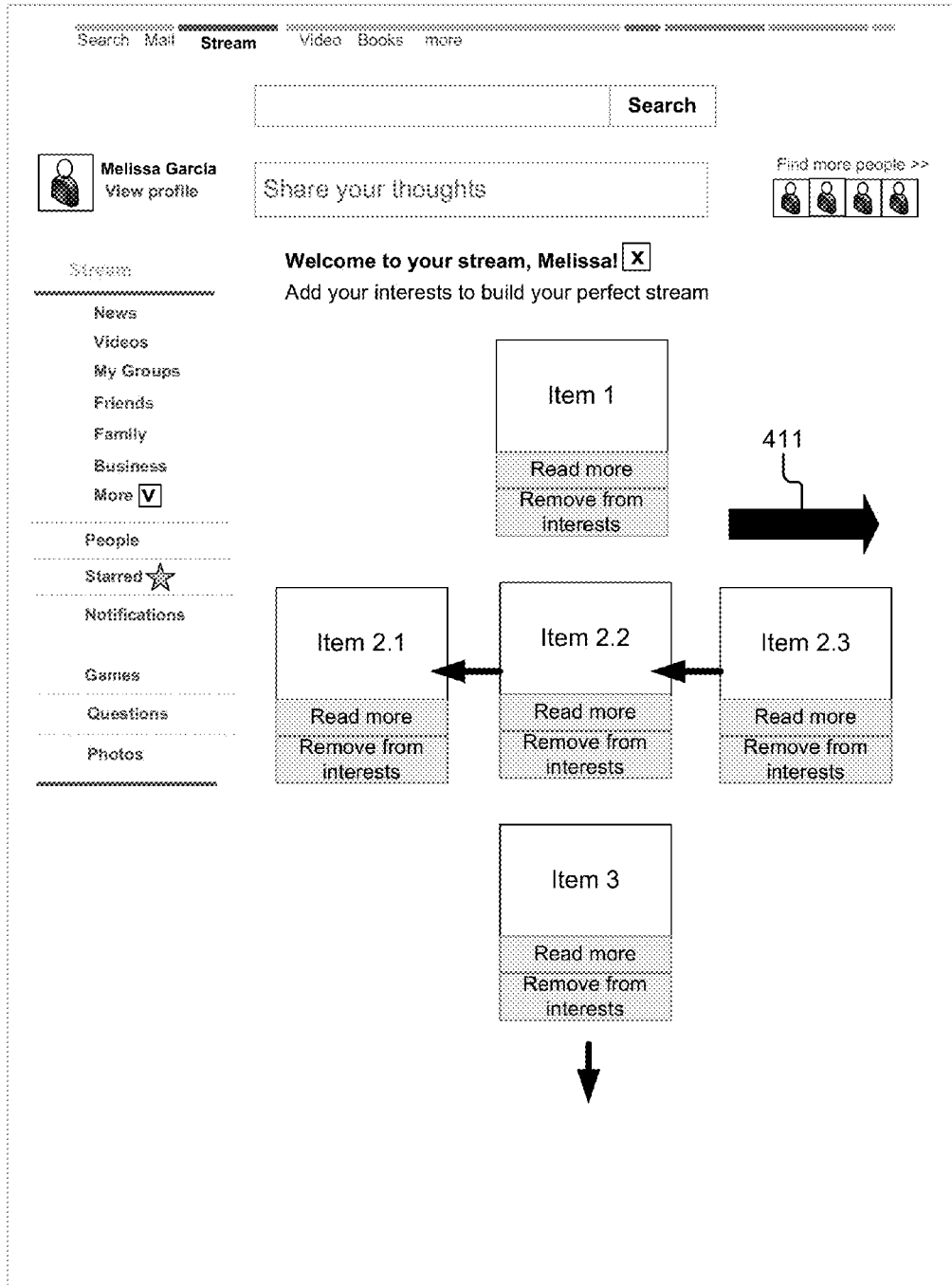
FIG. 4C is a graphic representation of an example user interface that includes a response to a user selecting a large arrow.

FIG. 4C is a graphic representation of an example user interface 420 that includes a response to a user selecting the large arrow 411. The item 2 box disappears from view as the items move from right to left. As a result, the second row of items includes item 2.1, 2.2 and 2.3. These represent content items with the same interest.

Figure 4D:
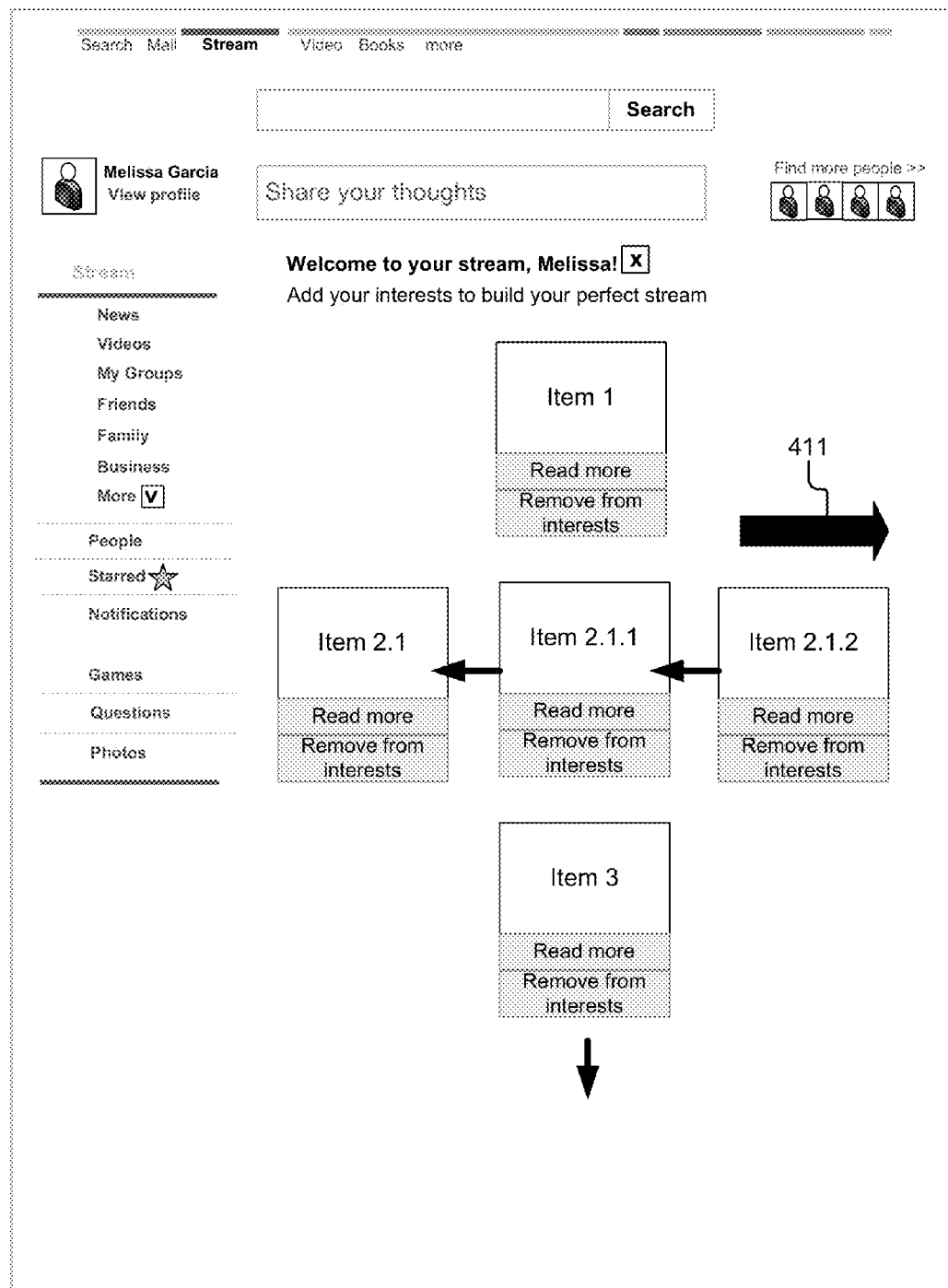
FIG. 4D is a graphic representation of an example user interface that includes subsets of a content item.

FIG. 4D is a graphic representation of an example user interface 430 where subsets of a content item are displayed responsive to the user selecting the large arrow 411. For example, if item 2 (not shown) is about biking, item 2.1 is about mountain biking, and item 2.1.1 is about cross-country mountain biking Items within the same decimal place include different content items about the same subset of interests. For example, item 2.1.2 is a different content item that also covers the cross-country mountain biking interest.

Figure 4E:
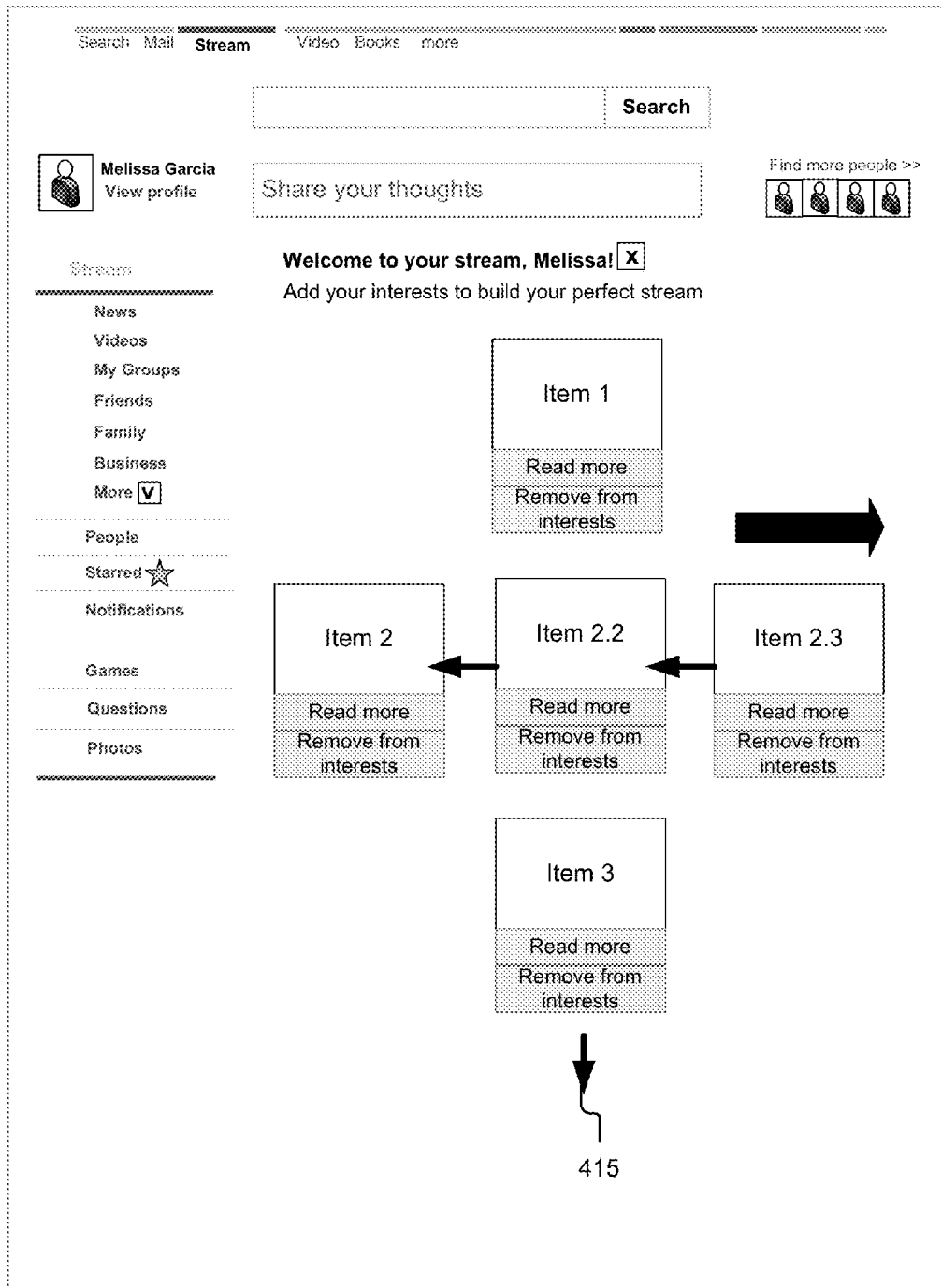
FIG. 4E is a graphic representation of an example user interface that includes a response to a user selecting the "remove from interests" button.

FIG. 4E is a graphic representation of an example user interface 440 that includes a response to a user selecting the "remove from interests" button 412 for item 2.1 that is in FIG. 4B. The user interface engine 230 removes item 2.1 from the user interface 440. Further, the model generation engine 207 removes the interest associated with item 2.1 from the model. Removing item 2.1 advances the other items on the horizontal axis such that Item 2.3 is now visible.

Figure 5:
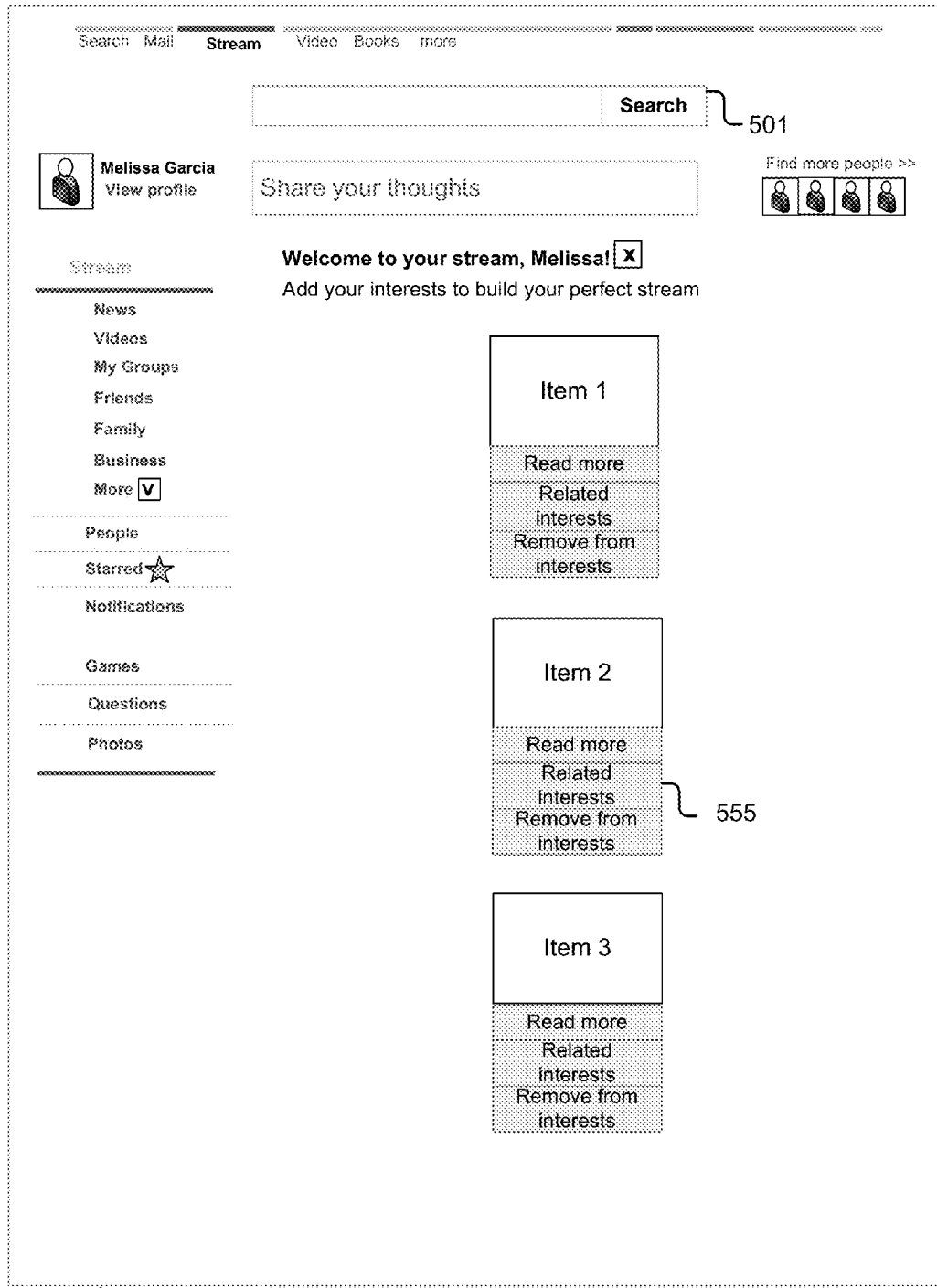
FIG. 5 is a graphic representation of an example user interface that includes a "related interests" button.

FIG. 5 is a graphic representation of an example user interface 500 where a list of related interests 555 is included below the content item. An interest is anything that a user can follow, for example, entities, sources and people. An entity is the subject matter of the content item, for example, swimming. The source describes who created the content, for example, Newspaper N. The people are other users that create content items. Selecting the "related interests" button 555 can result in the user interface engine 230 including multiple interests, for example mountain biking, Video Service and Sara Smith. When a user selects one of the interests, the user interface engine 230 includes content items matching the criteria. In some implementations, the related interests are displayed in a vertical direction. In some implementations, the related interests are displayed in a horizontal direction. By expanding the content items in a certain direction, the user interface engine 230 maintains the context of the original stream of content.

The user interface 500 in FIG. 5 enables pivot browsing. Pivot browsing occurs when the user interface engine 230 includes a list of content items, the user selects a related interest, the user interface engine 230 includes content items related to the original content item, the user selects a related interest for the next set of content items, etc. Pivot browsing can also be achieved by entering terms into the search bar 501. The search bar 501 accepts exact search terms as well as free text queries. The user inputs a search term, for example, mountain biking, and the scoring engine 211 returns matching content items that the user interface engine 230 includes in the user interface 500. From these content items, the user is also able to read more, select related interests and remove interests from the model.

Figure 6A:
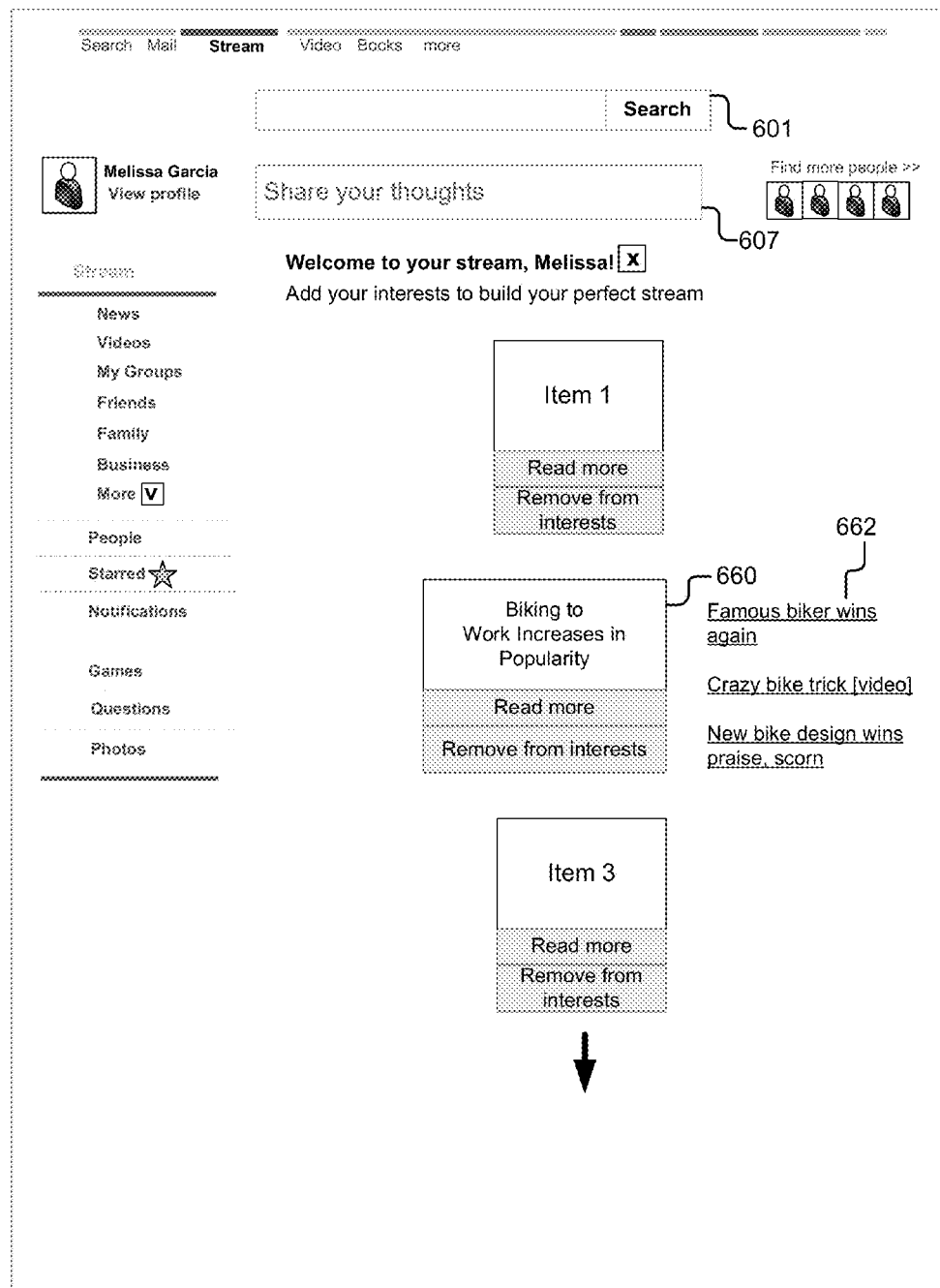
FIG. 6A is a graphic representation of an example user interface that includes a list of links to the right of the content item.

FIG. 6A is a graphic representation of an example user interface 600 where a list of links is displayed to the right of the content item. In this example, the second box contains items that match the interest for biking. The featured content box 660 contains an article on how biking to work has increased in popularity. The list of articles are also about biking: an article 662 on a famous biker winning again, a video for a crazy bike trick and an article on a new bike design that wins both praise and scorn.

Figure 6B:
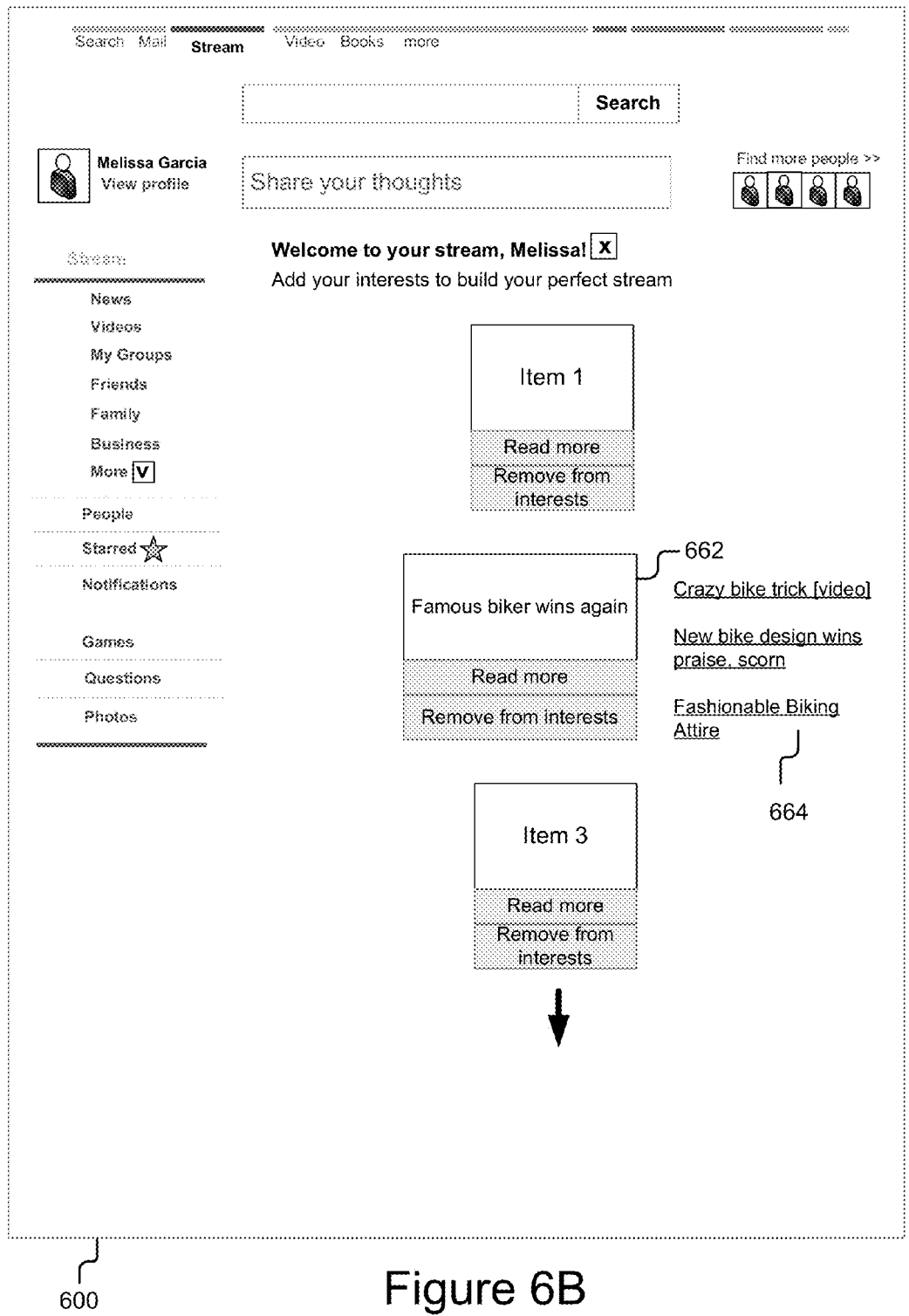
FIG. 6B is a graphic representation of an example user interface that includes a response of a user selecting a link.
Figure 7:
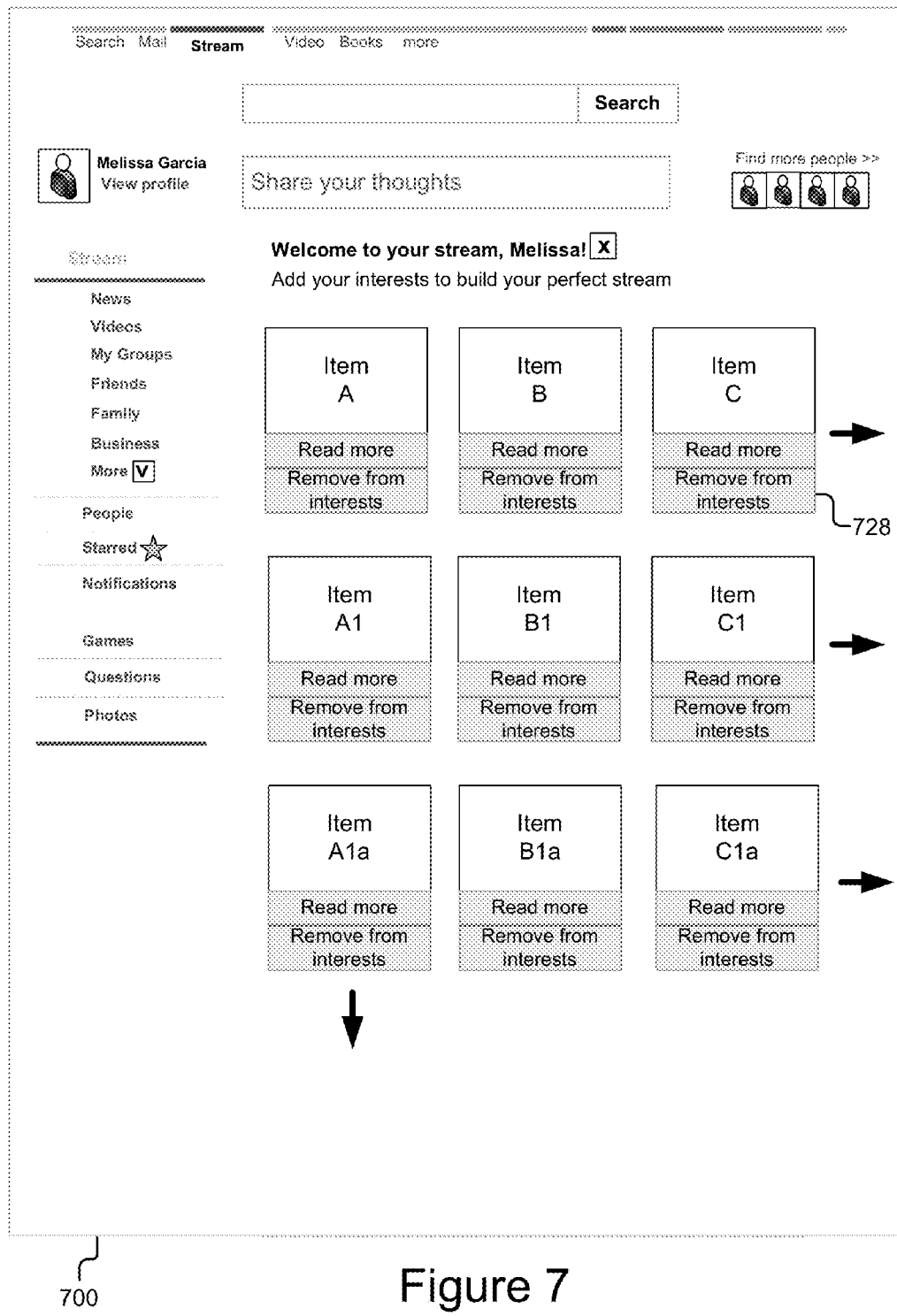
FIG. 7 is a graphic representation of an example user interface that includes content items for different interests.

FIG. 6B is a graphic representation of an example user interface 610 that includes a response to the user selecting the article 662 about a famous biker winning again. In response, the user interface engine 230 moves the famous biker article 662 to the center. Moving the famous biker article 662 to the center causes the next content item about biking to advance in the list. The last item that shows up in the list is an article 664 about fashionable attire to wear while biking FIG. 7 is a graphic representation of an example user interface 700 where content items for different interests are displayed on the horizontal axis and content items for subsets of interests are displayed on the vertical axis. The addition of content items and removal of interests can occur at any level. Removing an interest at the top level causes the vertical interest group to be removed. For example, when a user selects the "remove from interests" button 728 for item C, the vertical interest group of item C is removed from the user interface 700.

Figure 8:
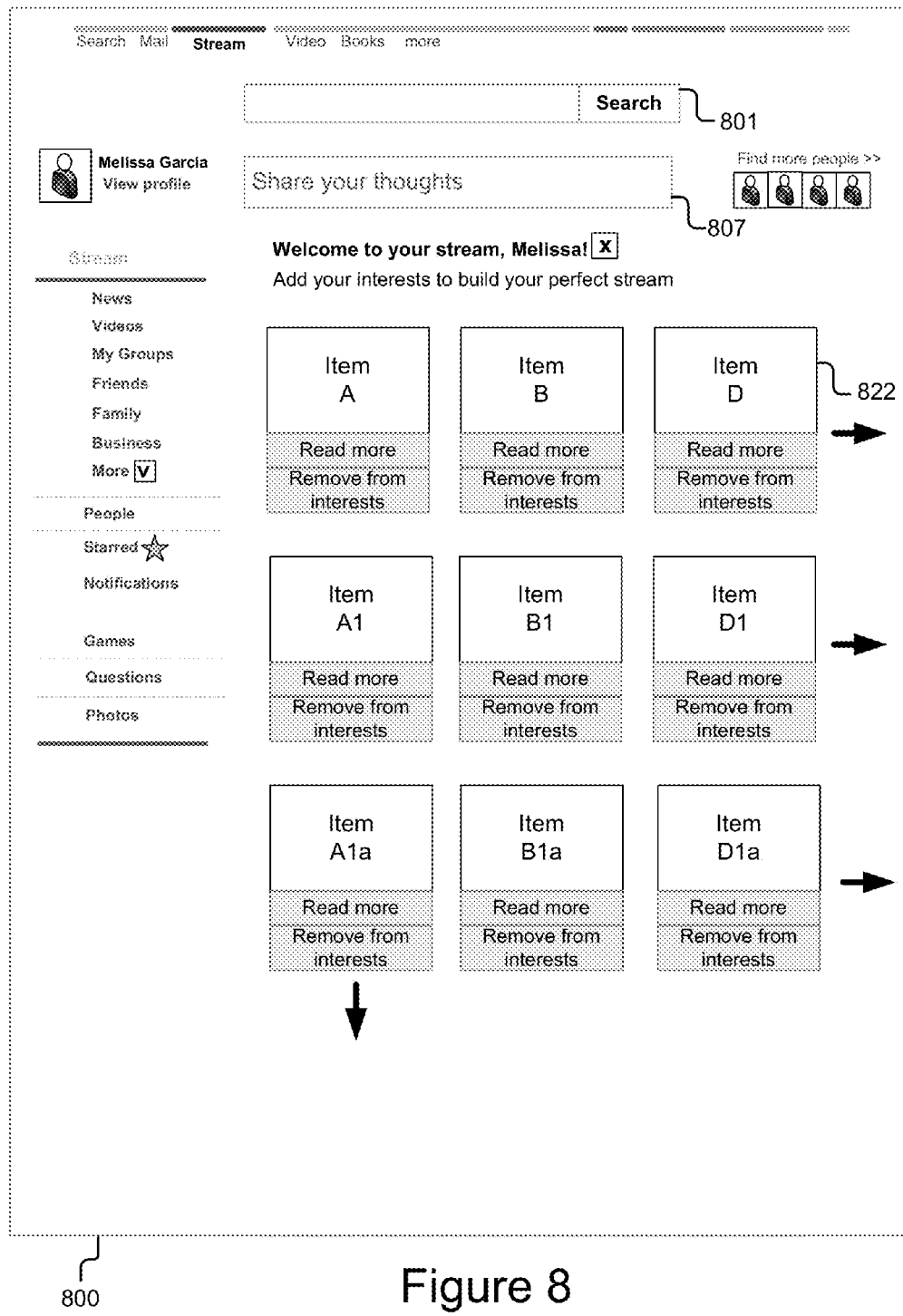
FIG. 8 is a graphic representation of an example user interface that includes a replacement interest.

FIG. 8 is a graphical representation of an example user interface 800 that includes a replacement interest for the item C that was removed in FIG. 7. In this example, once the group of item C is removed, the scoring engine 211 generates a stream of content for a new hypothetical interest of the user and the user interface engine 230 displays items D 822, D1 and D1a on this interest.

Asking for additional content items and removing interests causes changes to the model. As the user makes alterations to subsets of interests, the changes can result in altering the highest level of interests as well. For example, asking for more content items with interests that involve physical activity causes the model to suggest more interests involving physical activity and fewer leisure activities. As a result, when a user reads items, scrolls through the items for more interests, drills down to a more narrow level, etc. and then exits the user interface, it results in a different stream of content being generated the next time that the user accesses the user interface. This is a sleek and efficient way to help keep the content interesting and current with the user's interests.

Referring now to FIGS. 9-13, various implementations of the method of the specification will be described.

Figure 9:
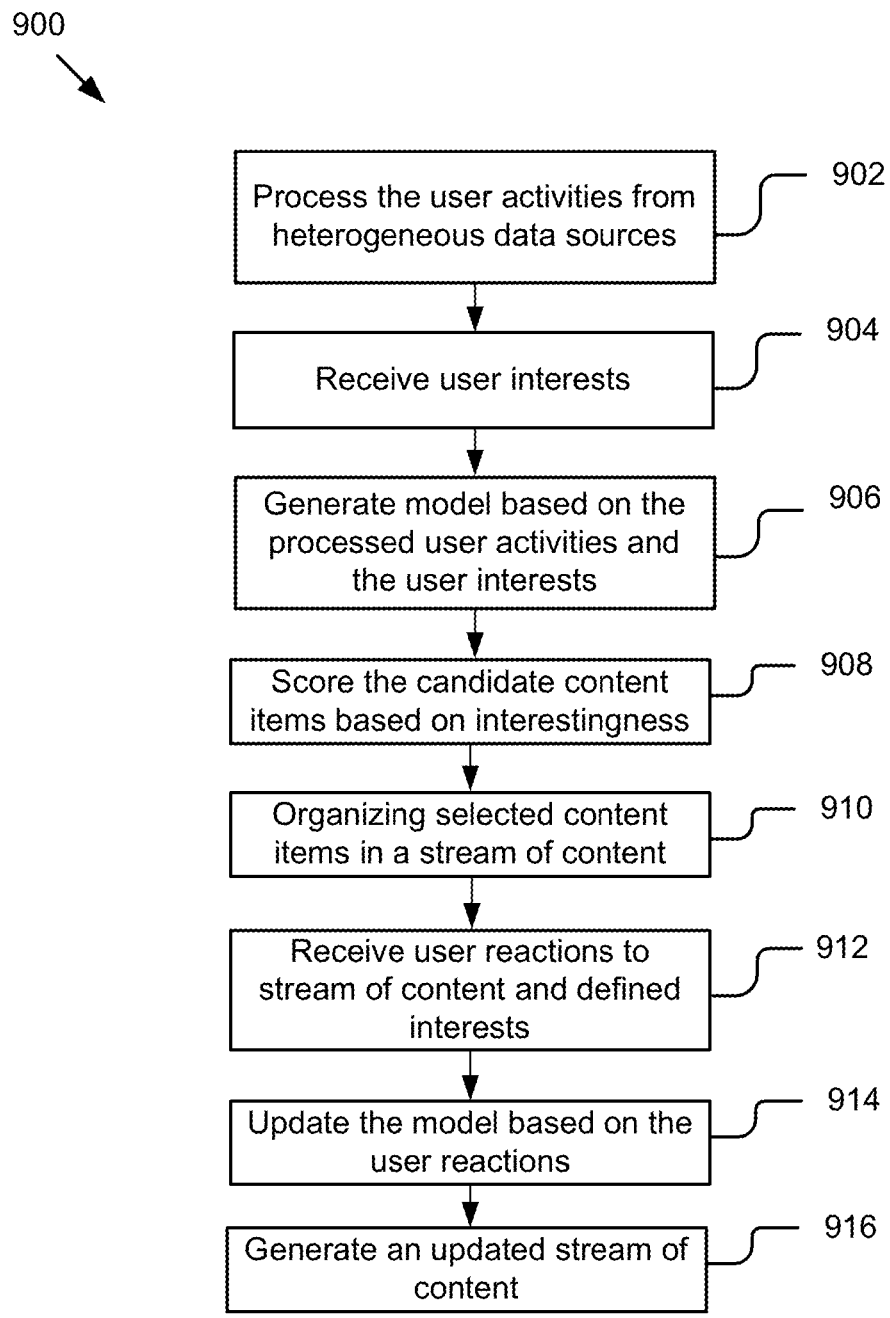
FIG. 9 is a flow diagram of an example method for generating a model based on user interests.

FIG. 9 is a flow diagram 900 of some implementations of a method for generating a model. The processing module 202 receives information about user activities and processes 902 the user activities from heterogeneous data sources. The heterogeneous data sources include search (for example web, video, news, maps, alerts), entertainment (for example news, video, a personalized homepage, blogs, a reader, gadget subscriptions), social activity (for example interactions through electronic messages, profile information, text messaging for example short message service (SMS), microblog, comments on photos, a social graph and other social networking information) and activity on third-party sites (for example websites that provide ratings, reviews and social networks where users indicate that they approve of content). The processing module 202 transmits data to storage, for example, memory 237 or a data storage server 265 (depending upon the embodiment). The processing module 202 also receives 904 user interests. The user interests are explicit or implicit.

The model generation engine 207 receives the processed user activities from the processing module 202 and generates 906 a model based on the processed user activities and user interests. If the processed user activities and user interests are unavailable (e.g. if the user is new), the model generation engine 207 creates a generic model based on global user activities. In some implementations, the model generation engine 207 generates a model each time the scoring engine 211 receives a request for a stream of content. In some implementations, the model is generated periodically.

The scoring engine 211 scores 908 the candidate content items based on interestingness to the user and organizes 910 selected content items in a stream of content by selecting the highest-scored items for the stream of content or selected candidate content items with scores that exceed a threshold. The scores are used by the scoring engine 211 to identify a threshold level for content items that are likely to be interesting to a user.

In some implementations, the stream of content includes an explanation for why at least one content item is provided to the user, for example, an explanation that it matches one of the user's defined interests. The user reacts to the stream of content, for example, by sharing a link, indicating that the link is interesting or indicating that the suggestion was wrong. In some embodiments, the user interface engine 230 provides button next to the selected content items for adding or removing the interest associated with the content item from the model. The model generation engine 207 receives 912 the user reactions to the stream of content and defined interests. The model generation engine 207 updates 914 the model based on the user reactions and the scoring engine generates 916 an updated stream of content. For example, the updated stream of content includes new content items based on the adding or removing of interests from the user model.

Figure 10:
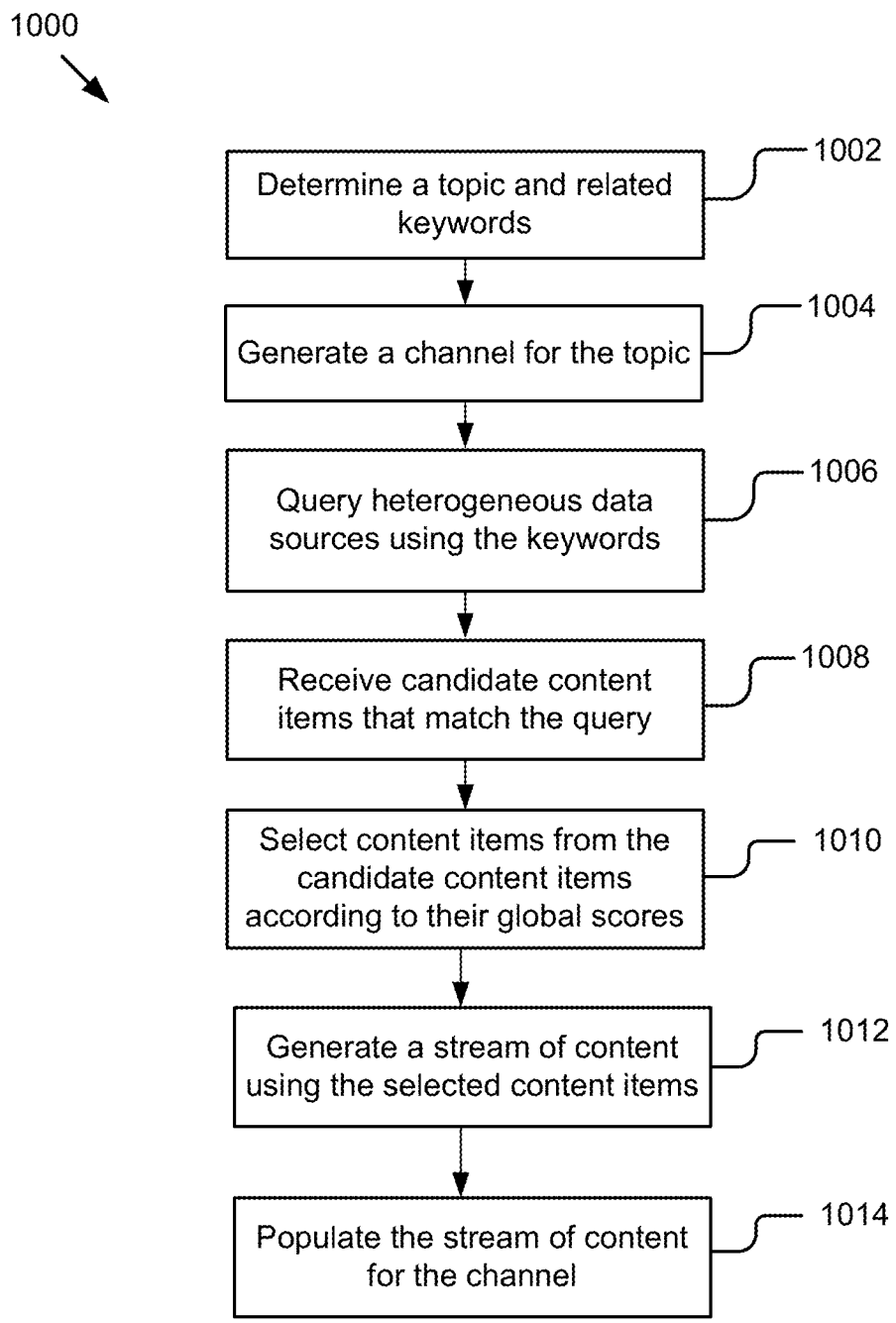
FIG. 10 is a flow diagram of an example method for generating a channel from data sources.

FIG. 10 is a flow diagram 1000 of some implementations of a method for generating a channel for a topic. The channel engine 220 determines 1002 a topic and related keywords for a channel. In some implementations, the topic and the related keywords are determined based on the most popular content items from the heterogeneous data sources. In some implementations, the topic is requested by a third party or an individual and includes a brief description about the channel for this topic. The channel engine 220 generates 1004 a channel for the topic.

The channel engine 220 queries 1006 heterogeneous data sources using the keywords. In some implementations the channel engine 220 queries the heterogeneous data sources directly and some implementations the channel engine 220 queries a database that stores candidate content items from heterogeneous data sources. The channel engine 220 receives 1008 candidate content items that match the query. The candidate content items are retrieved from heterogeneous data sources that include, for example, news articles, microblogs, blogs, videos, photos, posts on social networks, etc. The candidate content items contain the keywords and are related to the topic.

The channel engine 220 selects 1010 content items from the candidate content items according to their global scores. The global scores are indicators of the overall interestingness of the candidate content items. In some implementations, the global score of all the selected content items exceeds a certain threshold. This ensures that less popular content is not displayed in situations where there is not enough space to display a complete content stream. The channel engine 220 generates 1012 a stream of content for the channel using the selected content items. The channel engine 220 populates 1014 the stream of content for the channel and the user interface engine 230 provides the user device 115 with the stream of content.

Figure 11:
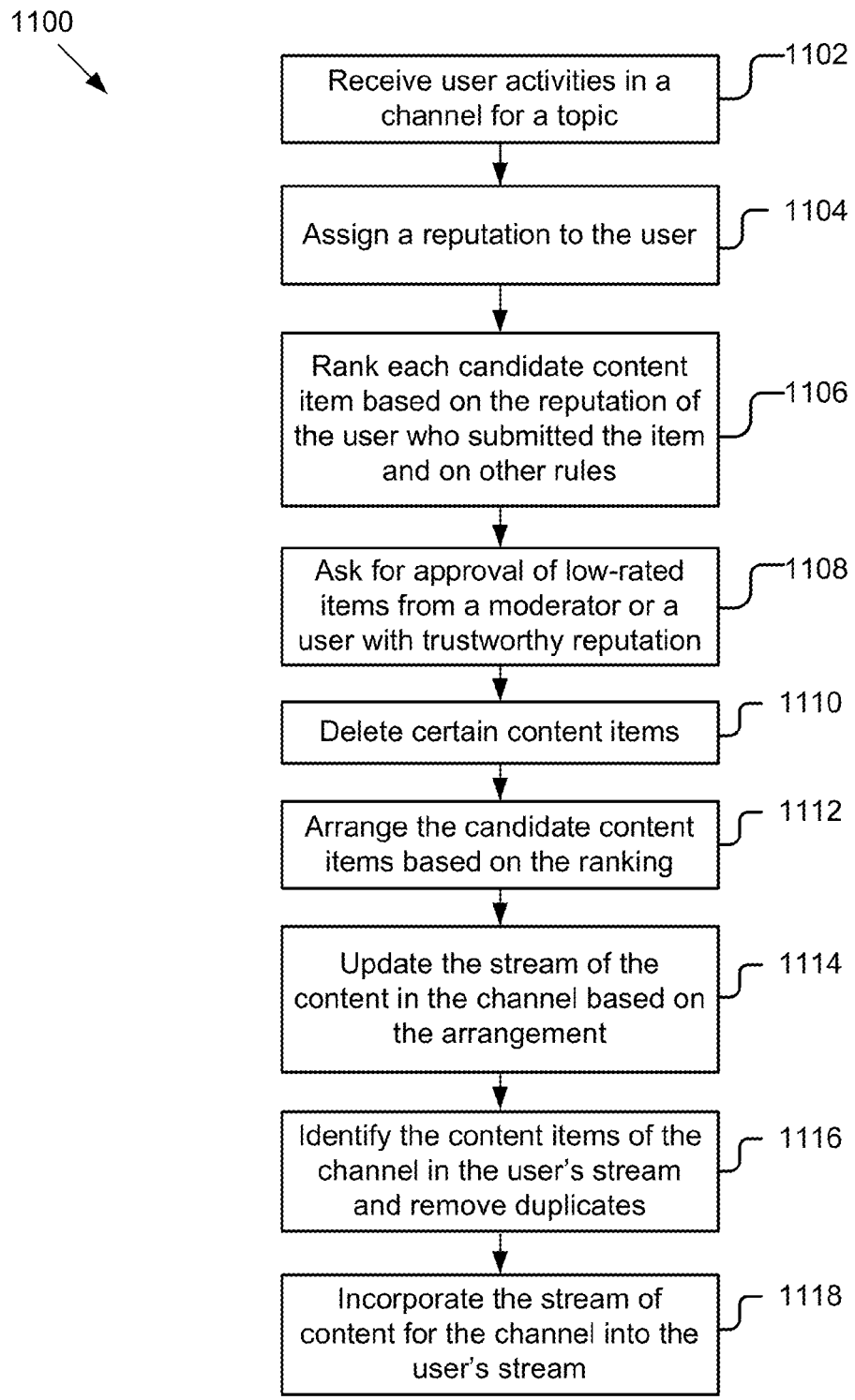
FIG. 11 is a flow diagram of an example method for updating a channel.

FIG. 11 is a flow diagram 1100 of some implementations of a method for updating a channel. The channel engine 220 receives 1102 user activities in a channel for a topic. The activities include, for example, a blog post, a microblog post, a text-based post, a news feed, a video upload, a picture upload, a message post and a new article post. The channel engine 220 assigns 1104 a reputation to the user of the channel based on rules that include, for example, a number of other users that read the selected content items submitted by the user, a number of comments submitted by other users and a number of indications of approval of the content items submitted by the user.

The channel engine 220 ranks 1106 each candidate content item based on the reputation of the user who submits the item and according to such rules as the originality and the popularity of the item in the channel. For example, the channel engine 220 assigns a high ranking to a content item because it is submitted by a user with a trusthworthy reputation. In some examples, the channel engine 220 assigns an item a high ranking when the item is original and the item is popular in the channel (e.g., receiving a large number of readers, comments and approvals). The channel engine 220 asks 1108 for approval of low-rated items for publication in the channel from a moderator or a user with a trusthworthy reputation (e.g. a high reputation).

The channel engine 220 deletes 1110 certain content items. In some implementations, the obsolete candidate content items are deleted. In some implementations, the candidate content items older than a period of time, for example a month, are deleted.

The channel engine 220 arranges 1112 the candidate content items based on the ranking and updates 1114 the stream of content for the channel based on the arrangement. The channel engine 220 identifies 1116 the content items in the channel and also in the stream of content for a user and removes the duplicates. The channel engine 220 incorporates 1118 the stream of content for the channel into the user's stream of the content.

Figure 12:
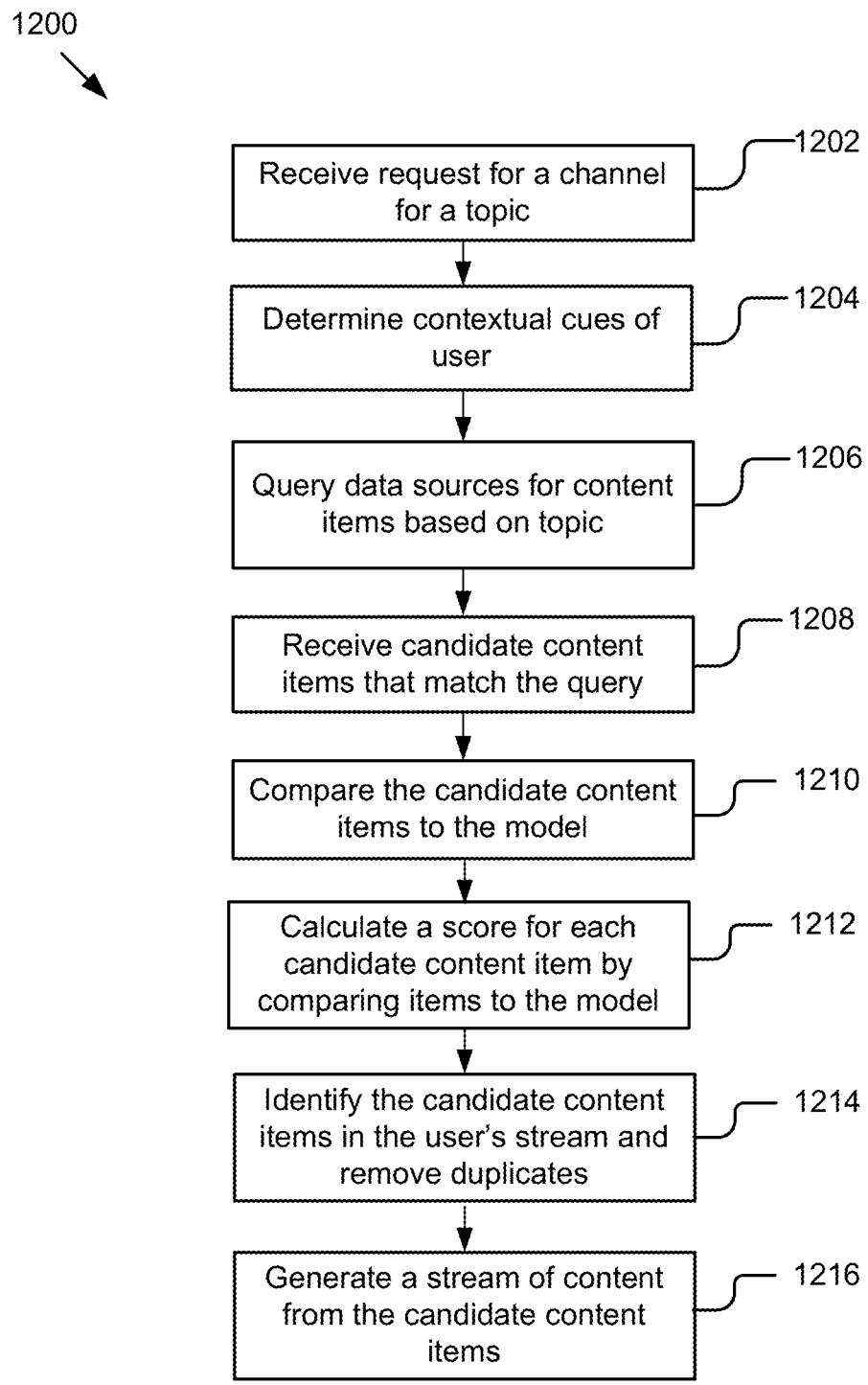
FIG. 12 is a flow diagram of an example method for personalizing a channel for a user.

FIG. 12 is a flow diagram 1200 of some implementations of a method for personalizing a channel for a user. The contextual module 213 receives 1202 a request for a channel for a topic from a user and determines 1204 the contextual cues of the user. For example, the contextual module 213 determines that the user is located in San Francisco, Calif., is female and has recently searched for a recipe for making gazpacho. The scoring engine 211 queries 1206 the data sources for content items based on the topic and, in some implementations, the contextual cues. The scoring engine 211 receives 1208 candidate content items that match the query from the channel. The scoring engine 211 compares 1210 the candidate content items to the model and calculates 1212 a score for each candidate content item by comparing items to the model. In some implementations, the scoring engine 211 uses the contextual cues to further narrow the number of the candidate content items. In some implementations, other users can subscribe to the personalized stream of content for the channel.

In some implementations, the scoring engine 211 identifies 1214 the candidate content items in the stream of content for the user and removes duplicates. The scoring engine 211 generates 1216 a stream of content from the candidate content items.

Figure 13:
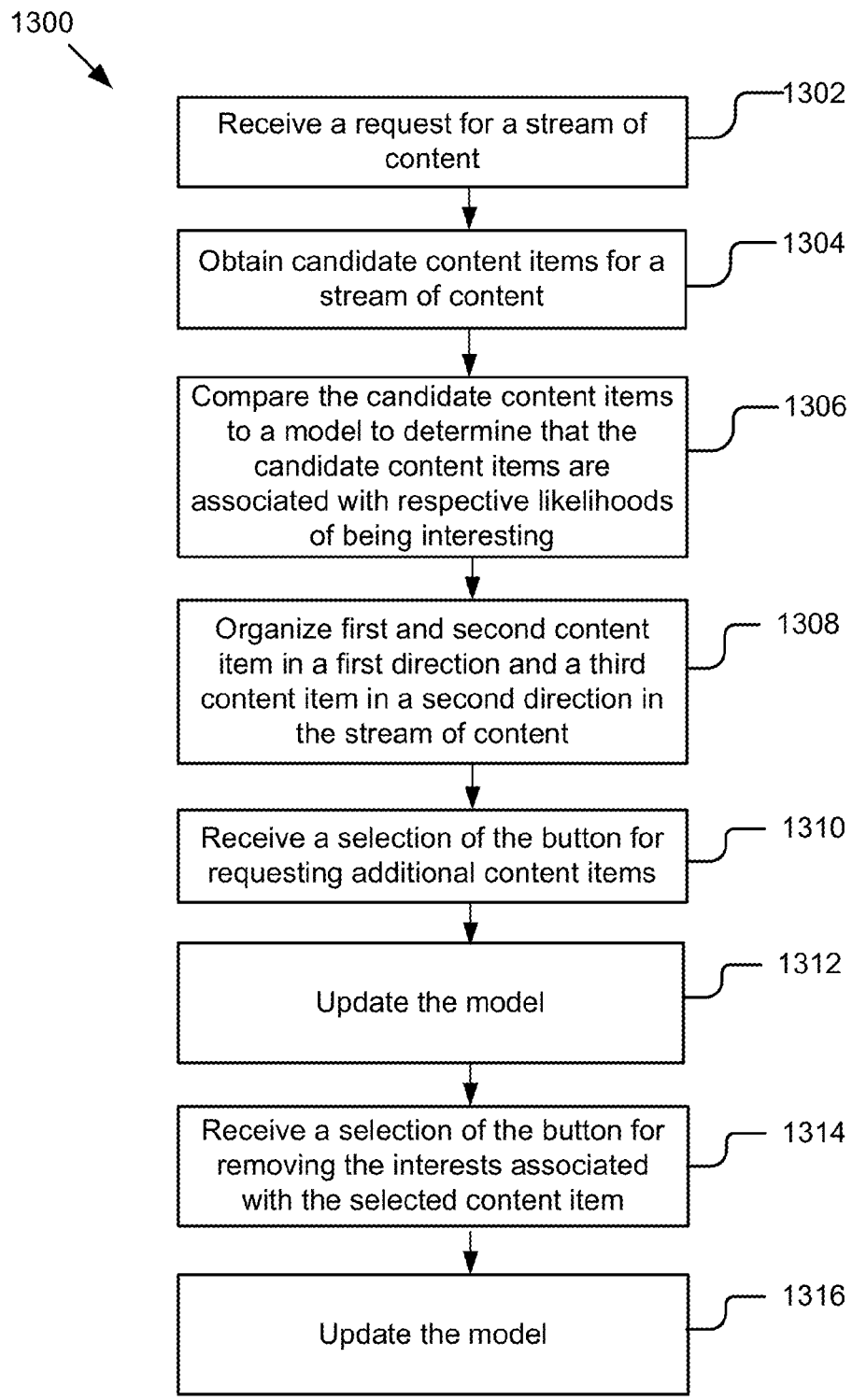
FIG. 13 is a flow diagram of an example method for providing a user interface to a user.

FIG. 13 is a flow diagram 1300 of an example method for providing a stream of content to a user. The scoring engine 211 receives 1302 a request for a stream of content and obtains 1304 candidate content items for a stream of content. The scoring engine 211 compares 1306 the candidate content items to a model to determine that the candidate content items are associated with respective likelihoods of being interesting.

The scoring engine 211 transmits the stream of content to the user interface engine 230, which organizes first and second content items in a first direction and a third content item in a second direction in the stream of content. In some instances, the first and second content items are associated with the same interest, although the second item can include a more narrow interest and the first item, for example, the first item is biking and the second item is mountain biking. The third content item is associated with a different interest. The different direction includes, for example, the first and second items being organized in a horizontal direction and the third content item being organized in a vertical direction.

The user interface engine 230 receives 1310 a selection of the button for requesting additional content items and transmits the information to the model generation engine 207, which updates 1312 the model. The user interface engine 230 receives 1314 a selection of the button for removing the interests associated with the selected content item and transmits the information to the model generation engine 207, which updates 1316 the model.

In the above description, for purposes of explanation, numerous specific details are set forth in order to provide a thorough understanding of the specification. The implementations can be practiced without these specific details. In other instances, structures and devices are shown in block diagram form in order to avoid obscuring the specification. For example, the specification is described in some implementations with reference to user interfaces and particular hardware. However, the description applies to any type of computing device that can receive data and commands, and any peripheral devices providing services.

Reference in the specification to "some implementations" or "an embodiment" means that a particular feature, structure, or characteristic described in connection with the embodiment is included in at least some implementations. The appearances of the phrase "in some implementations" in various places in the specification are not necessarily all referring to the same embodiment.

Some portions of the detailed descriptions are presented in terms of algorithms and symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms for example "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some implementations can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the specification is not described with reference to any particular programming language. It will be appreciated that a variety of programming languages may be used to implement the teachings of the various implementations as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
obtaining a group of candidate content items for one or more streams of content from heterogeneous data sources;
generating, with one or more processors, a model for a user comprising an interest of the user and a prior interaction of the user with the heterogeneous data sources;
computing, with the one or more processors, an interestingness score for each candidate content item in the group by combining properties of each candidate content item over single-attribute properties using the model and based upon interestingness of each candidate content item to the user and an extent to which the candidate content item's popularity has changed within a geographic area associated with the user;
comparing the interestingness score for each candidate content item with a threshold for a first interest type and a second interest type to determine which candidate content items have an interestingness score that exceeds the threshold for the first interest type or the second interest type;
organizing a first content item and a second content item that have an interestingness score that exceeds the threshold in a first stream of content;
providing the first stream of content for presentation in a first direction to the user;
generating a user interface for configuring the one or more streams of content, the user interface comprising the first content item, the second content item and a marker, the marker associated with the second content item for the user to request a third content item related to the second content item; and
responsive to receiving a selection of the marker associated with the second content item from the user, organizing the second and third content items in a second stream of content, providing the second stream of content for presentation in a second direction to the user, and updating the user interface to include the second stream of content.

2. The method of claim 1, wherein the second content item is associated with the second type of interest, the method further comprising:
   receiving a selection of the second content item from the user; and
   modifying the model based on the second type of interest.

3. The method of claim 1, further comprising:
   determining a query from user interests, social connections and recent search terms input by the user, wherein obtaining the group of candidate content items is based on querying the heterogeneous data sources using the query.

4. The method of claim 1, further comprising responsive to receiving selections of the marker from the user displaying new content items that move in the second direction.

5. The method of claim 1, wherein the first direction is vertical and the second direction is horizontal.

6. The method of claim 1, wherein the user interface further comprises a description of the first type of interest and a description of the second type of interest.

7. The method of claim 1, wherein the first content item is displayed with a button for requesting additional content items for the first type of interest and further comprising:
   receiving a selection of the button for requesting the additional content items; and
   adding the first type of interest to the model for the user.

8. The method of claim 1, wherein the first content item is displayed with a button for removing the first type of interest from the model.

9. The method of claim 8, further comprising:
   receiving a selection of the button for removing the first type of interest from the model; and
   removing the first type of interest from the model.

10. The method of claim 9, further comprising generating an updated stream of content based at least in part on an updated model.

11. A system comprising:
   a processor;
   a model generation engine stored on a memory and executed by the processor, the model generation engine for generating a model for a user comprising an interest of the user and prior interaction of the user with heterogeneous data sources;
   a scoring engine stored on the memory and executed by the processor, the scoring engine coupled to the model generation engine for obtaining a group of candidate content items for one or more streams of content from the heterogeneous data sources, computing an interestingness score for each candidate content item in the group by combining properties of each candidate content item over single-attribute properties using the model and based upon interestingness of each candidate content item to the user and an extent to which the candidate content item's popularity has changed within a geographic area associated with the user and comparing the interestingness score for each candidate content item with a threshold for a first interest type and a second interest type to determine which candidate content items have an interestingness score that exceeds the threshold for the first interest type or the second interest type; and
   a user interface engine coupled to the scoring engine, the user interface engine for organizing a first content item and a second content item in a first stream of content based on candidate content items that have an interestingness score that exceeds the threshold for the first interest type or the second interest type, providing the first stream of content for presentation in a first direction to the user, generating a user interface for configuring the one or more streams of content, the user interface comprising the first content item, the second content item and a marker, the marker associated with the second content item for the user to request a third content item related to the second content item, and responsive to receiving a selection of the marker associated with the second content item from the user, organizing the second and third content items in a second stream of content, providing the second stream of content for presentation in a second direction to the user, and updating the user interface to include the second stream of content.

12. The system of claim 11 wherein the second content item is associated with the second type of interest and the model generation engine receives a selection of the second content item from the user and modifies the model based on the second type of interest.

13. The system of claim 11, wherein the scoring engine determines a query from user interests, social connections and recent search terms input by the user, and obtains the group of candidate content items based on querying the heterogeneous data sources using the query.

14. The system of claim 11, wherein responsive to receiving selections of the marker from the user, the user interface engine displays new content items that move in the second direction.

15. The system of claim 11, wherein the first direction is vertical and the second direction is horizontal.

16. The system of claim 11, wherein the user interface further comprises a description of the first type of interest and a description of the second type of interest.

17. The system of claim 11, wherein the first content item is displayed with a button for requesting additional content items for the first type of interest and the model generation engine receives a selection of the button for requesting the additional content items and adds the first type of interest to the model for the user.

18. The system of claim 11, wherein the first content item is displayed with a button for removing the first type of interest from the model.

19. The system of claim 18, wherein the model generation engine receives a selection of the button for removing the first type of interest from the model and removes the first type of interest from the model.

20. The system of claim 18, wherein the scoring engine generates an updated stream of content based at least in part on an updated model.

21. A computer program product comprising a non-transitory computer useable medium including a computer readable program, wherein the computer readable program when executed on a computer causes the computer to:
   obtain a group of candidate content items for one or more streams of content from heterogeneous data sources;
   generate a model for a user comprising an interest of the user and prior interaction of the user with the heterogeneous data sources;
   compute an interestingness score for each candidate content item in the group by combining properties of each candidate content item over single-attribute properties using the model and based upon interestingness of each candidate content item to the user and an extent to which the candidate content item's popularity has changed within a geographic area associated with the user;

compare the interestingness score for each candidate content item with a threshold for a first interest type and a second interest type to determine which candidate content items have an interestingness score that exceeds the threshold for the first interest type or the second interest type;

organize a first content item and a second content item that have an interestingness score that exceeds the threshold for the first interest type or the second interest type in a first stream of content;

provide the first stream of content for presentation in a first direction to the user;

generate a user interface for configuring the one or more streams of content, the user interface comprising the first content item, the second content item and a marker, the marker associated with the second content item for the user to request a third content item related to the second content item; and responsive to receiving a selection of the marker associated with the second content item from the user, organize the second and third content items in a second stream of content, provide the second stream of content for presentation in a second direction to the user, and update the user interface to include the second stream of content.

* * * * *